United States Patent
Lee et al.

(10) Patent No.: US 7,848,218 B2
(45) Date of Patent: Dec. 7, 2010

(54) VIRTUAL MULTI-ANTENNA METHOD FOR OFDM SYSTEM AND OFDM-BASED CELLULAR SYSTEM

(75) Inventors: Hyo-Jin Lee, Daegu (KR); Jae-Young Ahn, Daejeon (KR); Yong-Soo Cho, Seoul (KR); Kyu-Jin Lee, Seoul (KR); Kyung-Won Park, Seoul (KR)

(73) Assignee: Electronics and Telecommunications Research Institute, Daejon (KR)

( * ) Notice: Subject to any disclaimer, the term of this patent is extended or adjusted under 35 U.S.C. 154(b) by 74 days.

(21) Appl. No.: 12/064,206

(22) PCT Filed: Aug. 18, 2006

(86) PCT No.: PCT/KR2006/003247
§ 371 (c)(1),
(2), (4) Date: Sep. 19, 2008

(87) PCT Pub. No.: WO2007/021153
PCT Pub. Date: Feb. 22, 2007

(65) Prior Publication Data
US 2009/0010149 A1    Jan. 8, 2009

(30) Foreign Application Priority Data
Aug. 19, 2005  (KR) ............... 10-2005-0076463
Sep. 2, 2005  (KR) ............... 10-2005-0081778
Aug. 8, 2006  (KR) ............... 10-2006-0074792

(51) Int. Cl.
*H04J 11/00* (2006.01)
(52) U.S. Cl. ............. 370/208; 370/491; 370/343
(58) Field of Classification Search ......... 370/230–253, 370/208, 341
See application file for complete search history.

(56) References Cited

U.S. PATENT DOCUMENTS

2004/0104844 A1    6/2004   Van Rooyen et al.

(Continued)

FOREIGN PATENT DOCUMENTS

KR    1020050046303    5/2005

(Continued)

OTHER PUBLICATIONS

Hyunseok Yu, et al., Transmit selection diversity technique in the MIMO-OFDM systems for HSDPA, Vehicular Technology Conference, 2004, VTC2004-Spring, 2004 IEEE 59th.

(Continued)

*Primary Examiner*—Ricky Ngo
*Assistant Examiner*—Iqbal Zaidi
(74) *Attorney, Agent, or Firm*—Jae Y. Park; Kile Park Goekjian Reed & McManus PLLC

(57) ABSTRACT

Provided are a virtual multi-antenna method for an orthogonal frequency division multiplexing (OFDM) system and an OFDM-based cellular system. The virtual multi-antenna method includes grouping sub-carriers in a frequency domain of an OFDM symbol and generating at least one group including G sub-carriers; and regarding the G sub-carriers included in the at least one group as multiple channels used in a multi-antenna technique and virtually applying the multi-antenna technique to the transmission and reception of the OFDM symbol. The virtual multi-antenna method can effectively reduce an interference signal and obtain the effects of a spatial division multiple access (SDMA) technique without physically using multiple antennas.

44 Claims, 17 Drawing Sheets

U.S. PATENT DOCUMENTS

| | | | |
|---|---|---|---|
| 2004/0114618 A1* | 6/2004 | Tong et al. | 370/431 |
| 2005/0002325 A1* | 1/2005 | Giannakis et al. | 370/208 |
| 2008/0037691 A1* | 2/2008 | Papathanasiou et al. | 375/347 |

FOREIGN PATENT DOCUMENTS

| | | |
|---|---|---|
| KR | 1020060042170 | 5/2006 |
| KR | 1020060043035 | 5/2006 |

OTHER PUBLICATIONS

Mahadevappa R., Rate-feedback schemes for MIMO-OFDM wireless LANS, Vehicular Technology Conference, 2004, VTC2004-Fall, 2004 IEEE 60th.

International Search Report for PCT/KR2006/003247, dated Nov. 20, 2006.

Written Opinion for PCT/KR2006/003247, dated Nov. 20, 2006.

* cited by examiner

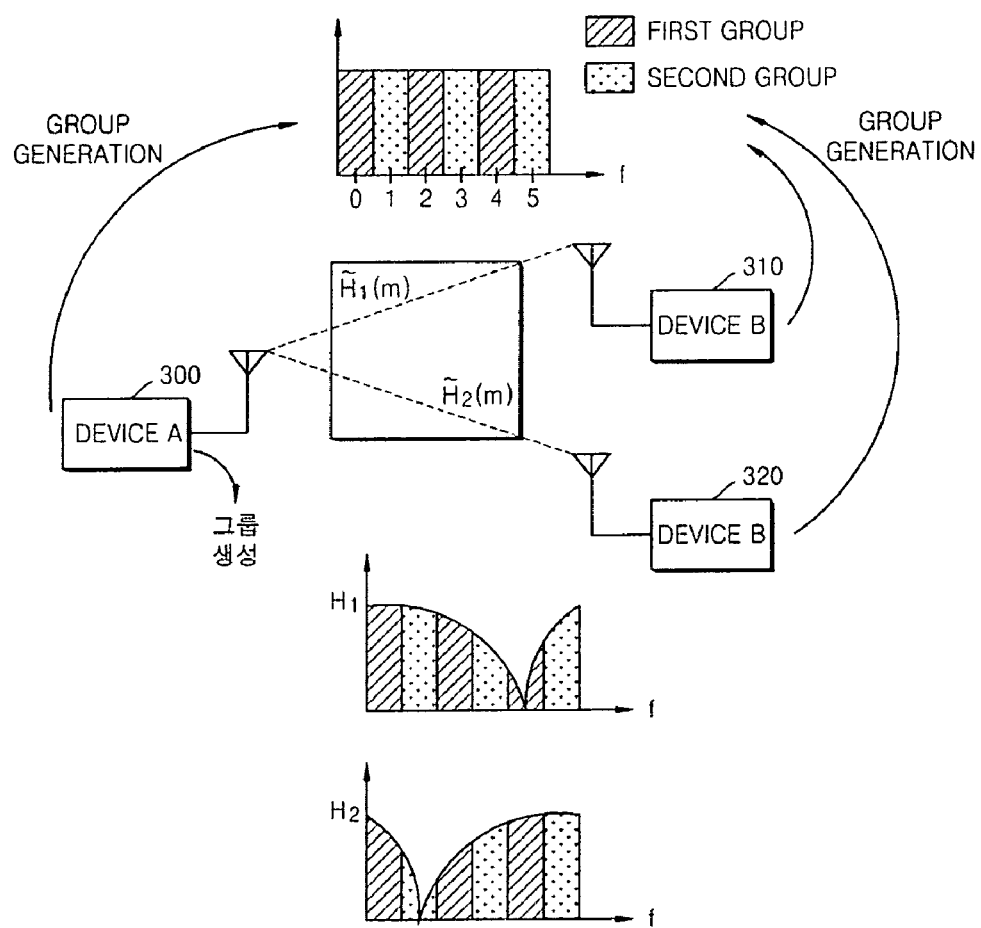

VIRTUAL MULTI-ANTENNA METHOD FOR OFDM SYSTEM AND OFDM-BASED CELLULAR SYSTEM

CROSS-REFERENCE TO RELATED PATENT APPLICATION

This application claims the priorities of Korean Patent Applications No. 10-2005-0076463, filed on Aug. 19, 2005, No. 10-2005-0081778, filed on Sep. 2, 2005, and No. 10-2006-0074792, filed on Aug. 8, 2006, in the Korean Intellectual Property Office, the disclosures of which are incorporated herein in their entirety by reference.

BACKGROUND OF THE INVENTION

1. Field of the Invention

The present invention relates to an orthogonal frequency division multiplexing (OFDM) system and an OFDM-based cellular system, and more particularly, a method of virtually applying a multi-antenna technique to an OFDM system and an OFDM-based cellular system in order to eliminate an interference signal or obtain the effects of a spatial division multiple access (SDMA) technique.

2. Description of the Related Art

Orthogonal frequency division multiplexing (OFDM) offers a number of advantages. First, OFDM can remove inter-symbol interference (ISI) by inserting a cyclic prefix (CP) that is longer than an channel impulse response length into a guard interval between adjacent OFDM symbols. In addition, a receiving end can compensate for fading distortion using a single tap equalizer. In OFDM, modulation and demodulation can also be performed at high speeds using an inverse fast fourier transform (IFFT) and a fast fourier transform (FFT).

Such advantages of OFDM have resulted in the development of OFDM wireless communication systems. In other words, high-speed data transmission systems, such as digital audio broadcasting (DAB), digital video broadcasting (DVB), digital terrestrial television broadcasting (DTTB), local area network (LAN), and IEEE 802.16 broadband wireless access are being developed. These OFDM wireless communication systems are considered as core technologies for next-generation mobile communication and, accordingly, are actively being researched.

At the same time, a multi-antenna technique is also actively being researched. The multi-antenna technique is a transmission method that can provide high-speed data transmission in a reliable manner and increase system capacity. In the multi-antenna technique, a receiving/transmitting end uses a plurality of antennas. Some examples of the multi-antenna technique include a spatial division multiple access (SDMA) technique and a smart antenna technique. The SDMA technique, which is a multi-antenna technique, enables a plurality of users to simultaneously use a channel of the same frequency in the same cell in a cellular system. The smart antenna technique forms a beam in a desired direction using the arrangement structure of the antennas, thereby effectively removing the interference and increasing signal reliability. However, the multi-antenna technique can be applied only when the number of transmitting/receiving antennas increases, which, in turn, aggravates hardware complexity.

Another technique for removing interference is a multi-carrier code division technique. In the multi-carrier code division technique, a transmitting/receiving end with a single antenna removes the interference of the plurality of users or adjacent cells using an orthogonal code. One of the disadvantages of the multi-carrier code division technique is that the orthogonality can be disrupted according to the characteristics of a channel carrying an orthogonal signal and synchronization errors.

SUMMARY OF THE INVENTION

The present invention provides a virtual multi-antenna method for an orthogonal frequency division multiplexing (OFDM) system and an OFDM-based cellular system, the virtual multi-antenna method is capable of effectively reducing an interference signal and obtaining the effects of a spatial division multiple access (SDMA) technique without physically using multiple antennas.

According to an aspect of the present invention, there is provided a virtual multi-antenna method for an orthogonal frequency division multiplexing (OFDM) system. The virtual multi-antenna method includes grouping sub-carriers in a frequency domain of an OFDM symbol and generating at least one group including G sub-carriers; regarding the G sub-carriers included in the at least one group as multiple channels used in a multi-antenna technique and virtually applying the multi-antenna technique to the transmission and reception of the OFDM symbol.

The multi-antenna technique used in the regarding of the G sub-carriers as the multiple channels used in the multi-antenna technique and the virtually applying of the multi-antenna technique may include a spatial division multiple access (SDMA) technique, a multi input multi output (MIMO) detection technique, and a smart antenna technique.

The regarding of the G sub-carriers as the multiple channels used in the multi-antenna technique and the virtually applying of the multi-antenna technique may include estimating channel responses of the G sub-carriers between $N_c$ receiving devices and a transmitting device using the transmitting device; pre-coding $N_c$ symbols that are to be transmitted over the G sub-carriers based on a channel matrix composed of the estimated channel responses during the transmitting, and thus pre-compensating for channel effects on the G sub-carriers; and transmitting an OFDM symbol comprising the $N_c$ pre-coded symbols from the transmitting device to the $N_c$ receiving devices.

The regarding of the G sub-carriers as the multiple channels used in the multi-antenna technique and the virtually applying of the multi-antenna technique may include multiplying symbols that are to be carried in the G sub-carriers by G weights for randomizing channels between $N_c$ transmitting devices, respectively, and transmitting an OFDM symbol comprising the multiplied symbols using each of the $N_c$ transmitting devices; estimating channel responses of the G sub-carriers between the $N_c$ terminals and a receiving device and multiplying each of the values of the estimated channel responses by a weight used by a target transmitting device using the receiving device; and applying a virtual multi-antenna technique based on the multiplied values of the estimated channel responses and detecting a signal transmitted from the target transmitting device using the receiving device.

The grouping of the sub-carriers and the generating of the at least one group may include generating the at least one group using any one of a comb-type grouping method, a cluster-type grouping method, and a random-type grouping method.

According to another aspect of the present invention, a virtual multi-antenna method for an uplink of an OFDM-based cellular system is provided. The virtual multi-antenna method includes grouping sub-carriers in a frequency domain of an OFDM symbol using a grouping method common to $N_c$ terminals and generating at least one group including G sub-carriers using $N_c$ terminals; mapping symbols to the G sub-carriers included in the at least one group in order to generate an OFDM symbol and transmitting the generated OFDM symbol to a base station using the $N_c$ terminals; and detecting a signal using a virtual multi-antenna technique in which reception signals of the G sub-carriers are regarded as signals received by G virtual antennas using the base station.

The mapping of the symbols and the transmitting of the generated OFDM symbol may include multiplying the symbols by G weights for randomizing uplink channels, respectively, and mapping the multiplied symbols to the G sub-carriers using the $N_c$ terminals, and the detecting of the signal may include estimating channel responses of the G sub-carriers, multiplying values of the estimated channel responses by the G weights, respectively, and applying the virtual multi-antenna technique based on the multiplied values of the estimated channel responses using the base station.

The G weights may be the same magnitudes and be M-ary phase shift keying (M-PSK) values.

The grouping of the sub-carriers and the generating of the at least one group may include generating the at least one group using any one of a comb-type grouping method, a cluster-type grouping method, and a random-type grouping method.

The virtual multi-antenna technique may be a virtual SDMA technique. The detecting of the signal may include eliminating an interference signal and detecting a signal of a desired user using a signal detection technique which includes a zero forcing (ZF) technique, a minimum mean square error (MMSE) technique, a successive interference cancellation (SIC) technique, a parallel interference cancellation (PIC) technique, and a maximum likelihood (ML) technique. The detecting of the signal may include simultaneously detecting signals of multiple users using the signal detection technique which includes the ZF technique, the MMSE technique, the SIC technique, the PIC technique, and the ML technique.

The $N_c$ terminals may include terminals located in a boundary area of a cell and terminals located in a boundary area of an adjacent cell.

The virtual multi-antenna technique may be a virtual smart antenna technique. The detecting of the signal may include estimating an auto-correlation matrix of a vector comprised of the reception signals of the G sub-carriers; estimating a symbol timing offset between the $N_c$ terminals; and detecting the signal using a weight of a virtual smart antenna calculated based on the estimated auto-correlation matrix and the symbol timing offset. The estimating of the auto-correlation matrix may include estimating the auto-correlation matrix using the fact that the effect of the symbol timing offset on the reception signals is represented as phase rotation between adjacent sub-carriers. The estimating of the symbol timing offset may include estimating the symbol timing offset by virtually applying a smart antenna technique, which includes a multiple signal classification (MUSIC) technique and an estimation of signal parameters via rotational invariance technique (ESPIRIT), to the estimated auto-correlation matrix and estimating the symbol timing offset. The detecting of the signal may include calculating the weight of the virtual smart antenna using a training signal-based technique which comprises a least mean square (LMS) technique, a recursive least square (RLS) technique, and a sample matrix inversion (SMI) technique. The detecting of the signal may include calculating the weight of the virtual smart antenna using a symbol timing offset-based technique which includes a null-steering technique and a minimum variance distortionless response (MVDR) technique. The detecting of the signal may include eliminating the interference signal using the virtual smart antenna technique and detecting the signal of the desired user. The detecting of the signal may include simultaneously detecting the signals of the multiple users using the virtual smart antenna technique.

The $N_c$ terminals may include the terminals located in the boundary area of the cell and the terminals located in the boundary area of the adjacent cell.

According to another aspect of the present invention, a virtual multi-antenna method for a downlink of an OFDM-based cellular system is provided. The virtual multi-antenna method includes grouping sub-carriers of an OFDM symbol and generating at least one group including G sub-carriers using a base station; calculating a channel response matrix for the G sub-carriers between $N_c$ terminals and the base station using the base station; pre-coding $N_c$ symbols based on the channel response matrix, and thus pre-compensating for effects of the downlink channels using the base station; and mapping the pre-coded $N_c$ symbols to the G sub-carriers, respectively, in order to generate an OFDM symbol and transmitting the generated OFDM symbol from the base station to the $N_c$ terminals.

The virtual multi-antenna method for the downlink of an OFDM-based cellular system may further include detecting a signal by adding reception signals of the G sub-carriers using each of the $N_c$ terminals.

The grouping of the sub-carriers and the generating of the at least one group may include generating the at least one group using any one of a comb-type grouping method, a cluster-type grouping method, and a random-type grouping method.

The pre-coding of the $N_c$ symbols may be performed using a ZF technique, an orthogonalization technique, a dirty paper coding (DPC) technique, and a Tomlinson-Harashima pre-coding (THP) technique.

The calculating of the channel response matrix may include calculating the channel response matrix by multiplying values of estimated channel responses of the G sub-carriers of each of the $N_c$ terminals by G weights for randomizing the downlink channels, respectively, using the base station.

The G weights may be the same values and be M-PSK values.

According to another aspect of the present invention, a virtual multi-antenna method for a downlink of an OFDM-based cellular system is provided. The virtual multi-antenna method includes grouping sub-carriers of an OFDM symbol using a grouping method common to $N_c$ base stations and generating at least one group including G sub-channels using $N_c$ base stations; mapping transmission symbols to the G sub-carriers in order to generate an OFDM symbol and transmitting the generated OFDM symbol to a terminal using the $N_c$ base station; and detecting a desired signal using a virtual multi-antenna technique in which reception signals of the G sub-carriers are regarded as signals received by G virtual antennas using the terminal.

The grouping of the sub-carriers and the generating of the at least one group may include generating the at least one group using any one of a comb-type grouping method, a cluster-type grouping method, and a random-type grouping method.

The virtual multi-antenna technique may be a virtual SDMA technique. The detecting of the desired signal may include eliminating an interference signal and detecting a signal transmitted from a cell to which the terminal belongs using a signal detection technique which includes a ZF technique, an MMSE technique, an SIC technique, a PIC technique, and an ML technique. The detecting of the desired signal may include simultaneously detecting a signal of an adjacent cell and a signal of a target cell using the signal detection technique which includes the ZF technique, the MMSE technique, the SIC technique, the PIC technique, and the ML technique.

The mapping of the transmission symbols and the transmitting of the generated OFDM symbol may include multiplying the transmission symbols by G weights for randomizing downlink channels, respectively, and mapping the multiplied transmission symbols to the G sub-carriers using each of the $N_c$ base stations, and the detecting of the desired signal may include estimating channel responses of the G sub-carriers, multiplying values of the estimated channel responses by the G weights, respectively, and applying the virtual multi-antenna technique based on the multiplied values of the estimated channel responses using the terminal. The G weights may be the same magnitudes and be M-PSK values.

The virtual multi-antenna technique may be a virtual smart antenna technique. The detecting of the desired signal may include estimating an auto-correlation matrix of a vector comprised of the reception signals of the G sub-carriers; estimating a symbol timing offset between adjacent cells; and detecting the desired signal using a weight of a virtual smart antenna calculated based on the estimated auto-correlation matrix and the symbol timing offset. The estimating of the auto-correlation matrix may include estimating the auto-correlation matrix using the fact that the effect of the symbol timing offset on the reception signals is represented as phase rotation between adjacent sub-carriers. The estimating of the symbol timing offset may include estimating the symbol timing offset by virtually applying a smart antenna technique, which includes a MUSIC technique and an ESPIRIT technique, to the estimated auto-correlation matrix and estimating the symbol timing offset.

The detecting of the desired signal may include calculating the weight of the virtual smart antenna using a training signal-based technique that includes an LMS technique, an RLS technique, and an SMI technique. Also, the detecting of the desired signal may include calculating the weight of the virtual smart antenna using a symbol timing offset-based technique that includes a null-steering technique and an MVDR technique.

The detecting of the desired signal may include eliminating the interference signal of the adjacent cell using the virtual smart antenna technique and detecting the desired signal. The detecting of the desired signal may include simultaneously detecting the signal of the adjacent cell and the signal of the target cell using the virtual smart antenna technique.

BRIEF DESCRIPTION OF THE DRAWINGS

The above and other features and advantages of the present invention will become more apparent by describing in detail exemplary embodiments thereof with reference to the attached drawings in which:

FIG. 3 is a block diagram illustrating an OFDM system using a virtual multi-antenna technique according to an embodiment of the present invention;

DETAILED DESCRIPTION OF THE INVENTION

The present invention will now be described more fully with reference to the accompanying drawings, in which exemplary embodiments of the invention are shown.

The present invention will now be described more fully with reference to the accompanying drawings, in which exemplary embodiments of the invention are shown. The invention may, however, be embodied in many different forms and should not be construed as being limited to the embodiments set forth therein; rather, these embodiments are provided so that this disclosure will be thorough and complete, and will fully convey the concept of the invention to those skilled in the art.

Figure 1:
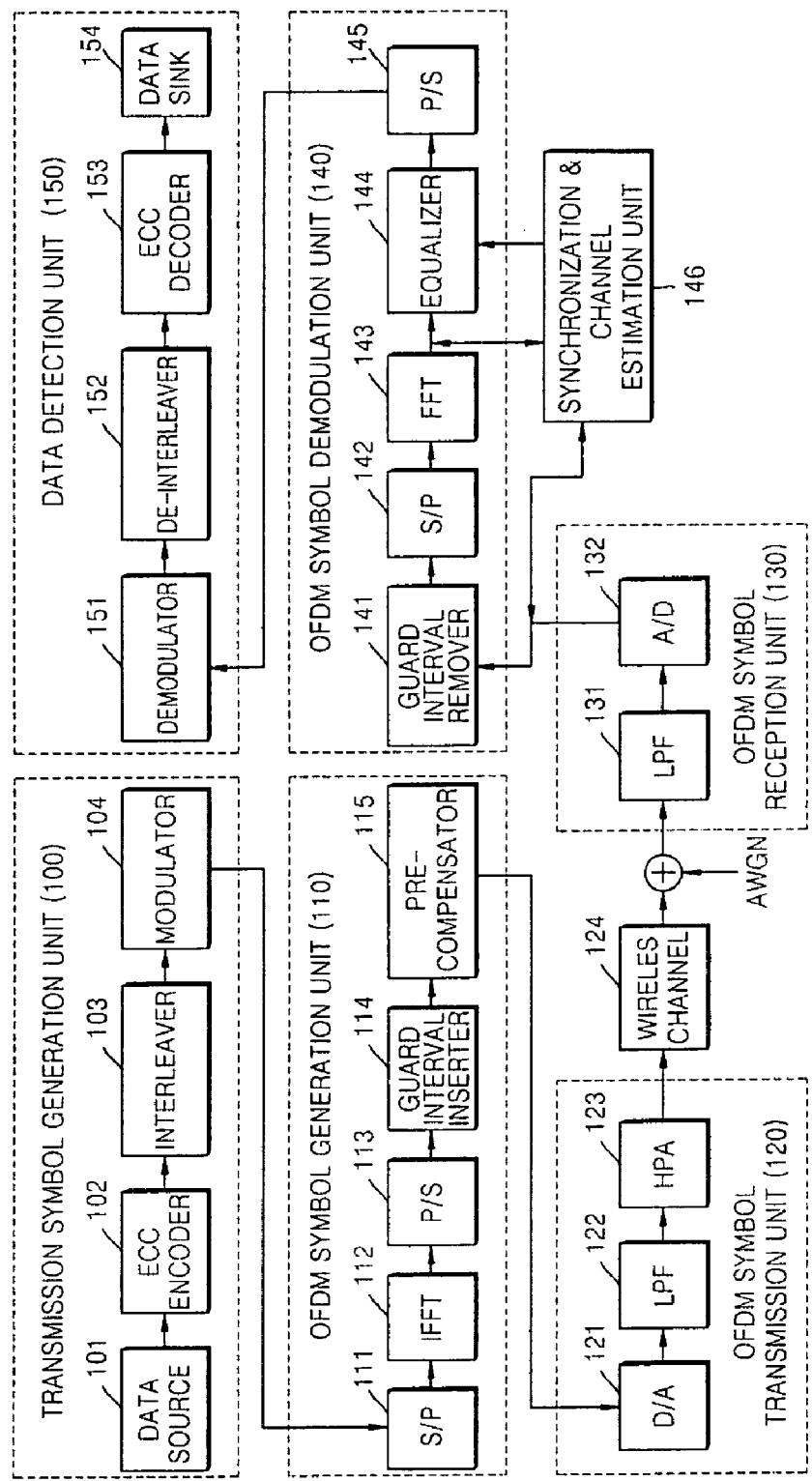
FIG. 1 is a block diagram of a general orthogonal frequency division multiplexing (OFDM) system.

FIG. 1 is a block diagram of a general orthogonal frequency division multiplexing (OFDM) system. Referring to FIG. 1, a transmitting end of the OFDM system includes a transmission symbol generation unit 100, an OFDM symbol generation unit 110, and an OFDM symbol transmission unit 120. In addition, a receiving end of the OFDM system includes an OFDM symbol reception unit 130, an OFDM symbol demodulation unit 140, and a data detection unit 150. For the convenience of the description of the present invention, the OFDM system was configured and the elements included in the OFDM system were named as illustrated in FIG. 1. However, the present invention may be applied not only to the OFDM system illustrated in FIG. 1 but also to all OFDM systems.

The transmission symbol generation unit 100 generates transmission symbols to be carried in a channel (sub-channel) according to each sub-carrier. A data source 101 of the transmission symbol generation unit 100 generates data, and an error correction code (ECC) encoder 102 of the transmission symbol generation unit 100 encodes the generated data such that the data can be robust to a wireless channel. An interleaver 103 interleaves the encoded data to enhance the ECC effect. A modulator 104 modulates the interleaved data into an M-ary phase shift keying (M-PSK) signal or an M-ary quadrature amplitude modulation (M-QAM) signal and generates N transmission symbols.

The OFDM symbol generation unit 110 generates an OFDM symbol composed of sub-channels carrying N transmission symbols. An S/P (Serial-to-Parallel Converter) 111 bundles the N transmission symbols serially inputted in units of N, and outputs the bundled N transmission symbols in parallel. An inverse fast fourier transform (IFFT) 112 performs an IFFT on the N transmission symbols. A P/S (Parallel-to-Serial Converter) 113 provides, in series, the IFFT results to a guard interval inserter 114. The guard interval inserter 114 inserts a guard interval including a cyclic prefix (CP) into an output signal of the P/S 113. The OFDM symbol generation unit 110 may further include a pre-compensator 115. The pre-compensator 115 performs a signal processing operation on an output of the guard interval inserter 114 to pre-compensate for the channel effect.

The OFDM symbol transmission unit 120 transmits the generated OFDM symbol over a wireless channel. To transmit the generated OFDM symbol, a D/A (Digital-to-Analogue Converter) 121 included in the OFDM symbol transmission unit 120 converts the generated OFDM symbol that is in a digital form into an analog signal. A low pass filter (LPF) 122 low-pass filters the analog signal to eliminate the effects of adjacent bands. A high power amplifier (HPA) 123 amplifies an output signal of the LPF 122. Although not shown in FIG. 1, the OFDM symbol transmission unit 120 may include at least one transmitting antenna to transmit the amplified output signal over the wireless channel.

Through at least one receiving antenna (not shown), the OFDM symbol reception unit 130 receives the amplified output signal which was converted from the OFDM symbol and transmitted over the wireless channel and provides the received signal to the OFDM symbol demodulation unit 140. An LPF 131 included in the OFDM symbol reception unit 130 low-pass filters the received signal to eliminate the effects of adjacent bands, and an A/D (Analog-to-Digital Converter) 132 converts an analog signal output from the LPF 131 into a digital signal.

The OFDM symbol demodulation unit 140 detects the N transmission symbols carried in the respective sub-channels of the OFDM symbol in an output signal of the OFDM symbol reception unit 130 and provides the N detected transmission symbols to the data detection unit 150. A synchronization & channel estimation unit 146 obtains the synchronization of the OFDM symbol and frequency synchronization based on a phase of each signal and estimates a channel response of each sub-channel. A guard interval remover 141 removes the guard interval from the output signal of the OFDM symbol reception unit 130 based on the obtained synchronizations. An S/P (Serial-to-Parallel Converter) 142 receives, in series, the OFDM symbol without the guard interval and provides the received OFDM symbol in parallel to a fast fourier transform (FFT) 143. An equalizer 144 performs an equalizing process operation on the reception symbol carried in each sub-channel based on a value of the estimated channel response. A P/S (Parallel-to-Serial Converter) 145 provides the N equalized reception signals in series to the data detection unit 150.

The data detection unit 150 detects data transmitted from the transmitting end based on the output signal of the OFDM symbol modulation unit 140. A modulator 151 modulates the output signal of the OFDM symbol demodulation unit 140 and provides the modulated data to a de-interleaver 152. The de-interleaver 152 de-interleaves the modulated data, which is a reverse process of the interleaving operation performed by the interleaver 103 of the transmission symbol generation unit 103. An ECC decoder 153 decodes the de-interleaved data, and a data sink 154 stores/consumes the decoded data.

In other words, the transmitting end of the conventional OFDM system multiplexes N transmission symbols arranged in parallel into different sub-carrier frequencies, adds the N multiplexed transmission symbols, and transmits the result of the addition. In this case, the N transmission symbols arranged in parallel constitute an OFDM symbol, and N sub-carriers of the OFDM symbol are orthogonal to one other. Hence, the sub-carrier channels do not affect one another. According to the above transmission method performed in the transmitting end, a symbol period can increase to the number N sub-channels while the same symbol transmission rate is maintained. Therefore, this method can better reduce an inter-symbol interference (ISI) caused by multi-path fading over a conventional single-carrier transmission method.

Figure 2A:
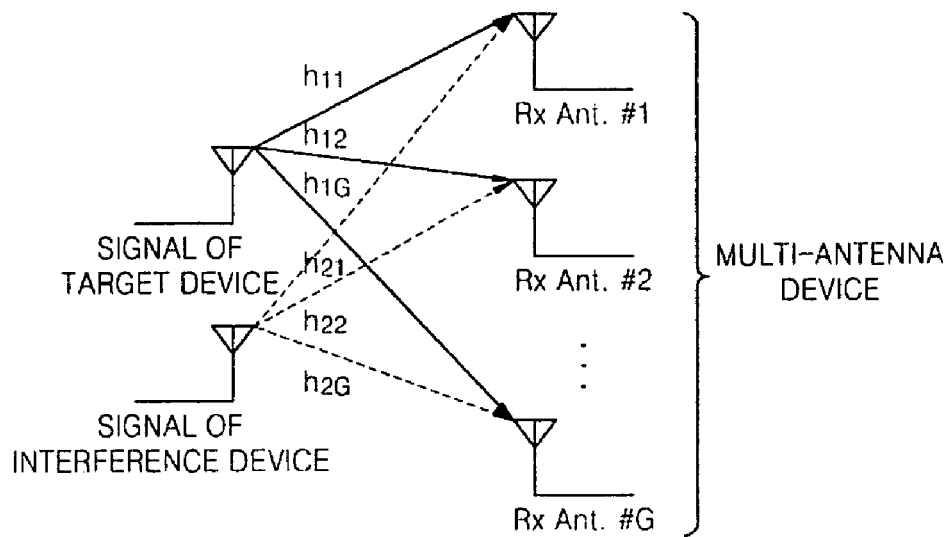
FIGS. 2A and 2B are diagrams for explaining the concepts of a conventional multi-input multi-output (MIMO) technique and a virtual MIMO technique according to an embodiment of the present invention.
Figure 2B:
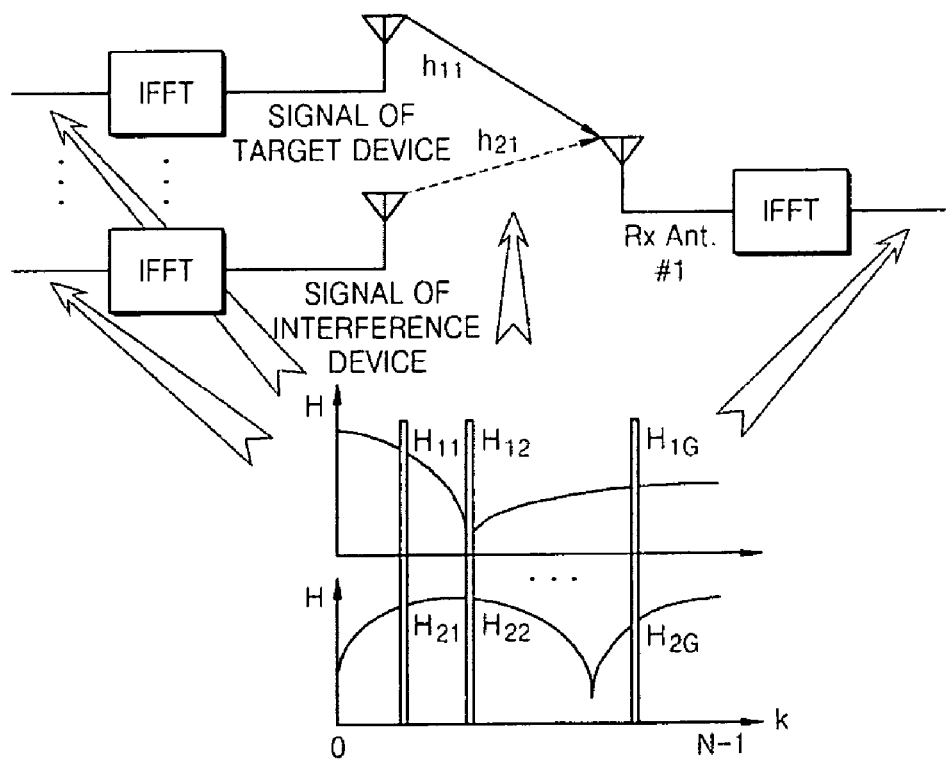

FIGS. 2A and 2B are diagrams for explaining the concepts of a conventional multi input multi output (MIMO) technique and a virtual MIMO technique according to an embodiment of the present invention.

Referring to FIG. 2A, in the conventional MIMO technique, a receiving end detects a desired signal or eliminates an interference signal using a multi-antenna device with G receiving antennas. For a target device, the multi-antenna device has multiple channels $h_{11}, h_{12}, \ldots, h_{1G}$ having channel responses in a time domain. For an interference device, the multi-antenna device has multiple channels $h_{21}, h_{22}, \ldots h_{2G}$ having channel responses in the time domain. The multi-antenna device detects both signals of the target device and the interference device or eliminates the signal of the interfering device from a received signal using the fact that the correlation between both types of multiple channels is low.

On the other hand, referring to FIG. 2B, the virtual MIMO technique according to an embodiment of the present invention regards G sub-channels in a frequency domain of an OFDM system as multiple channels used for the multi-antenna technique. Therefore, the effects of the MIMO technique can be achieved using only one antenna. In other words, even if each of a target device, an interference device, and a receiving device has one antenna, since identical transmission symbols are carried in G sub-channels of an OFDM symbol and are transmitted accordingly, the effects of the conventional MIMO technique of FIG. 2A can be achieved. Therefore, multiple channels $H_{11}, H_{12}, \ldots, H_{1G}$ in a frequency domain and multiple channels $H_{21}, H_{22}, \ldots, H_{2G}$ in the frequency domain respectively correspond to the multiple channels $h_{11}, h_{12}, \ldots, h_{1G}$ having channel responses in the time domain and the multiple channels $h_{21}, h_{22}, \ldots, h_{2G}$ having channel responses in the time domain as illustrated in FIG. 2A.

FIG. 3 is a block diagram illustrating an OFDM system using a virtual multi-antenna technique according to an embodiment of the present invention. Referring to FIG. 3, the OFDM system includes a device A 300 and devices B 310 and 320 for $N_c$=2, where $N_c$ is the number for devices. The devices A and B 300, 310 and 320 can perform OFDM-based transmission and reception, and each of the devices A and B 300, 310 and 320 includes one antenna. To use the virtual multi-antenna technique, the devices A and B 300, 310 and 320 bundle sub-channels composed of N (=6) sub-carriers into M (=2) groups. In other words, each group includes G (=3) sub-channels. A group having a group index m=0 includes three sub-channels corresponding to sub-carrier indices 0, 2 and 4, and a group having a group index m=1 includes three sub-channels corresponding to sub-carrier indices 1, 3 and 5. This grouping process is performed before the OFDM system including the devices A and B 300, 310 and 320 start communication.

Figure 4A:
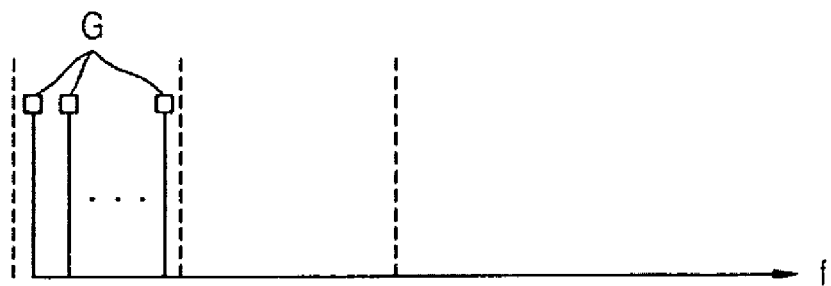
FIGS. 4A through 4C are diagrams for explaining grouping methods according to embodiments of the present invention.
Figure 4B:
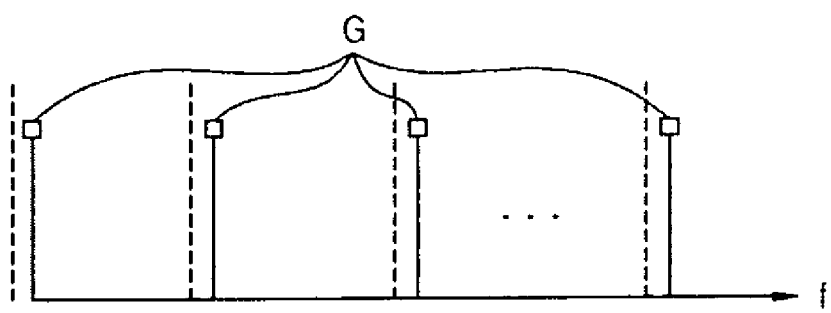
Figure 4C:
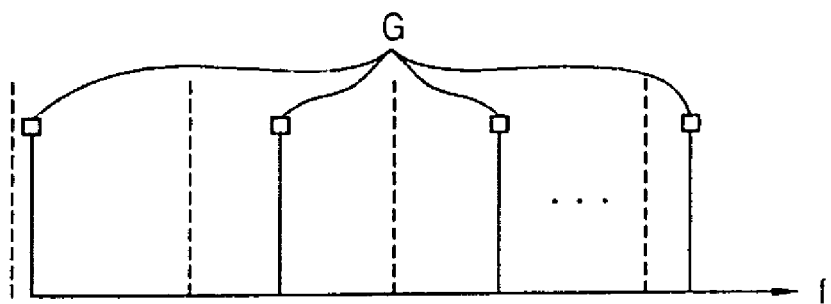

FIGS. 4A through 4C are diagrams for explaining grouping methods according to embodiments of the present invention. Specifically, FIG. 4A is a diagram for explaining a grouping method based on cluster-type resource allocation. FIG. 4B is a diagram for explaining a grouping method based on comb-type resource allocation. FIG. 4C is a diagram for explaining a grouping method based on random-type resource allocation. In the case of the grouping method based on cluster-type resource allocation, each group includes G adjacent sub-carriers. In the case of the grouping method based on the comb-type resource allocation, each group includes G sub-carriers separated from one another at intervals of M. In the case of the grouping method based on the random-type resource allocation, each group includes G sub-carriers separated from one another at random intervals. The grouping methods of FIGS. 4A through 4C are mere examples and not limited thereto. Hence, the present invention may use grouping methods other than those illustrated in FIGS. 4A through 4C.

Figure 5:
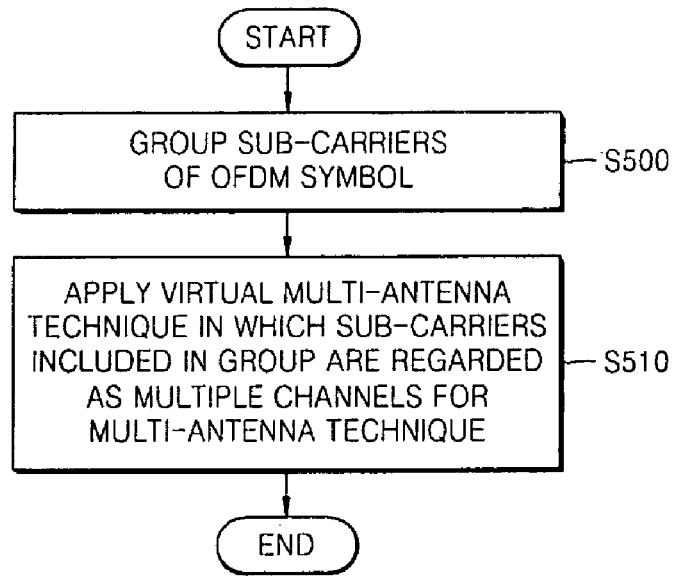
FIG. 5 is a flowchart illustrating a virtual multi-antenna technique for an OFDM system according to an embodiment of the present invention.

FIG. 5 is a flowchart illustrating a virtual multi-antenna technique for an OFDM system according to an embodiment of the present invention. The virtual multi-antenna technique according to the embodiment of the present embodiment will now be described with reference to FIG. 3.

In operation S500, all transmitting/receiving devices to which the present invention applies group sub-channels in a frequency domain of an OFDM symbol using the same grouping method and generate at least one group including G sub-channels. In the embodiment illustrated in FIG. 3, the devices A and B 300, 310 and 320 perform such a grouping process. As described above, the grouping process is conceptual, and all transmitting/receiving devices may have already completed the grouping process by the time when the OFDM system according to the present invention is implemented. Alternatively, after a device completes the grouping process, the device may provide information regarding a grouping method to the remaining devices so that the remaining devices can perform the grouping process based on the information.

In operation S510, all transmitting/receiving devices to which the present invention applies regard the G sub-channels included in the group as multiple channels for the virtual multi-antenna technique. Thus, the transmitting/receiving devices virtually apply the multi-antenna technique to the transmission/reception of the OFDM symbol. In other words, the device A 300 detects a desired signal by virtually applying the multi-antenna technique. An example of the desired signal may be a transmission symbol, which is an output signal of the transmission symbol generation unit 100 illustrated in FIG. 1 included in the device B 310 or the device B 320. If the device A 300 is a transmitting device, the device A 300 virtually applies the multi-antenna technique to transmit the signal such that the devices B 310 and 320, i.e., the receiving devices, can easily detect a desired signal. Such examples of the multi-antenna technique that apply in this case include a spatial division multiple access (SDMA) technique, a MIMO detection technique, and a smart antenna technique. However, the present invention is not limited thereto.

Figure 6A:
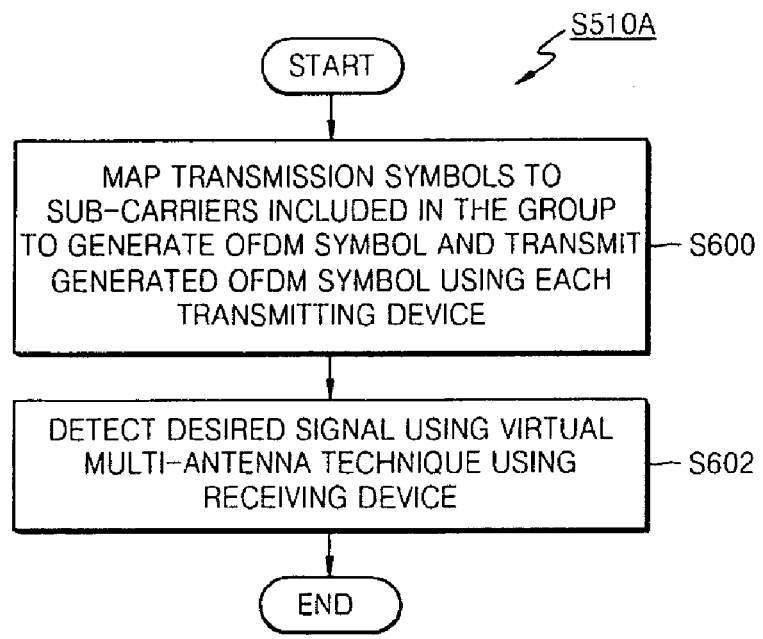
FIGS. 6A and 6B are detailed flowcharts illustrating operation S510 of the technique illustrated in FIG. 5, according to embodiments of the present invention.

FIG. 6A is a detailed flowchart illustrating operation S510 of the technique illustrated in FIG. 5 according to an embodiment of the present invention. Specifically, FIG. 6A illustrates a method of detecting a desired signal in a mixture of signals transmitted from $N_c$ transmitting devices by using the virtual multi-antenna technique. In this case, the devices B 310 and 320 illustrated in FIG. 3 are transmitting devices, and the device A 300 is a receiving device. In addition, the multi-antenna technique applied in the present embodiment may be a virtual SDMA technique or a virtual smart antenna technique. The following operations included in operation S510A will now be described with reference to FIGS. 6A and 3.

In operation S600, the devices B 310 and 320 map transmission symbols to the G sub-channels included in the group and generate an OFDM symbol and transmit the generated OFDM symbol to the device A 300. In the present embodiment, it is assumed that the device B 310 has transmission symbols $X_{i=1,m=0}$, $X_{i=1,m=1}$, and the device B 320 has transmission symbols $X_{i=2,m=0}$, $X_{i=2,m=1}$. In other words, the device B 310 transmits an OFDM symbol arranged in the form $X_{10}$, $X_{11}$, $X_{10}$, $X_{11}$, $X_{10}$, $X_{11}$ in the frequency domain, and the device B 320 transmits an OFDM symbol arranged in the form $X_{20}$, $X_{21}$, $X_{20}$, $X_{21}$, $X_{20}$, $X_{21}$ in the frequency domain.

In operation S602, the device A 300 receives a signal defined by Equation (1) and detects a desired signal using the multi-antenna technique. In other words, the device A 300 regards the reception signals of the G sub-channels included in the received signal as signals received by G virtual antennas and detects the desired signal. The reception signals of the G sub-channels are defined by Equation (2). The desired signal may be, for example, the transmission symbols $X_{10}$ and $X_{11}$ of the device B 310 or the transmission symbols $X_{10}$ and $X_{11}$ of the device B 320. Alternatively, the transmission symbols of both devices B 310 and 320 may be detected simultaneously. Meanwhile, such examples of the multi-antenna technique used in this case include the virtual SDMA technique and the virtual smart antenna technique, which will be described in detail later.

$$Y(k) = \sum_{i=1}^{N_c} H_i(k)X_i(k) + N_w(k), \quad k = 0, 1, \ldots, N-1, \quad (1)$$

where k indicates a sub-carrier index or a sub-channel index, N indicates the number of sub-carriers used when the OFDM system transmits transmission symbols, and Y(k) indicates a reception signal of a $k^{th}$ sub-channel. In addition, i indicates an index of a transmitting device having a value of 1 to $N_c$, and a transmitting device corresponding to i=2 is the device B 320. $X_i(k)$ indicates a transmission symbol of a $k^{th}$ sub-channel, and $H_i(k)$ indicates a frequency response of the $k^{th}$ sub-channel formed between an $i^{th}$ transmitting device and a receiving device. $N_w(k)$ indicates additive white gaussian noise (AWGN) with a mean of 0 and a dispersion of $\sigma^2$.

Reception signals of an $m^{th}$ group may be rearranged using Equation (1) to result in Equation (2).

$$Y(m) = \overline{H}(m)X(m) + N_w(m), \quad m \in \{0, 1, \ldots M-1\}, \quad (2)$$

where m indicates an index of a resource composed of G sub-channels, that is, a group index, and M=N/G. Y(m) indicates a reception signal vector of an $m^{th}$ group, and $\overline{H}(m)$ indicates a channel coefficient matrix of the $m^{th}$ group. $X(m)$ indicates a transmission signal vector, and $N_w(m)$ indicates a noise vector. $Y(m), \overline{H}(m), X(m)$ and $N_w(m)$ may be defined by Equations (3) through (6), respectively.

$$Y(m)=[Y(J_{m1}),Y(J_{m1}),\ldots,Y(J_{mG})]^T, \quad (3)$$

$$\overline{H}(m)=[\overline{H}_1(m),\overline{H}_2(m),\ldots,\overline{H}_{N_a}(m)], \quad (4)$$

$$X(m)=[X_1(m),X_2(m),\ldots,X_{N_a}(m)]^T, \quad (5)$$

$$N_w(m)=[N_w(J_{m1}),N_2(J_{m2}),\ldots,N_w(J_{mG})]^T, \quad (6)$$

where $J_{mg}$ indicates a sub-carrier index corresponding to a $g^{th}$ sub-carrier of an $m^{th}$ group and is determined according to the grouping methods illustrated in FIGS. 4A through 4C. Equations (7) through (9) respectively indicate sub-channel indices determined according to the cluster-type, comb-type, and random-type grouping methods.

$$J_{mg}=M\cdot m+g-1 \quad (7)$$

$$J_{mg}=M\cdot(g-1)+m \quad (8)$$

$$J_{mg}=M\cdot(g-1)+\text{rand}(m,g), \ g\in\{1,\ldots,G\}, \ J_{mg}\in\{0,1,\ldots,N-1\}, \quad (9)$$

where rand(m, g) has a value randomly selected from values of 0 to M−1. In Equation (4), $\overline{H}_i(m)$ indicates an $i^{th}$ column vector of $\overline{H}(m)$. In addition, $\overline{H}_i(m)$ indicates a channel response of an $m^{th}$ group formed between an $i^{th}$ transmitting device and a receiving device and is defined by Equation (10).

$$\overline{H}_1(m)=[H_i(J_{m1}),H_1(J_{m2}),\ldots,H_1(J_{mG})]^T \quad (10).$$

In Equation (4), if a channel corresponding to $\overline{H}_1(m)$ and a channel corresponding to $\overline{H}_2(m)$ are independent of each other, the transmission symbols of the devices B 310 and 320 can be detected using the virtual SDMA technique.

As the correlation between the channel corresponding to $\overline{H}_1(m)$ and the channel corresponding to $\overline{H}_2(m)$ increases, fewer benefits may be obtained from the virtual multi-antenna technique. Therefore, according to another embodiment of the present invention, an operation of randomizing channels may further be included in operation S510A as illustrated in FIG. 6A. In such a case, operation S600 may further include an operation in which each of the devices B 310 and 320 respectively multiplies transmission symbols by weights for randomizing channels and maps the multiplied transmission symbols to the G sub-channels. In other words, the device B 310 transmits an OFDM symbol including $c_1(0)X_{10}$, $c_1(0)X_{11}$, $c_1(1)X_{10}$, $c_1(1)X_{11}$, $c_1(2)X_{10}$, $c_1(2)X_{11}$ arranged in the frequency domain, and the device B 320 transmits an OFDM symbol including $c_2(0)X_{20}$, $c_2(0)X_{21}$, $c_2(1)X_{20}$, $c_2(1)X_{21}$, $c_2(2)X_{20}$, $c_2(2)X_{21}$ arranged in the frequency domain. In this case, $c_i(0), c_i(1), \ldots, c_i(G-1)$ indicates weights for randomization, which will be described in detail later. In operation S602, the device A 300 estimates and $\overline{H}_1(m)$ and $\overline{H}_2(m)$, multiplies the elements of the estimated $\overline{H}_1(m)$ and $\overline{H}_2(m)$ by the weights, respectively, and applies the virtual multi-antenna technique based on the multiplied channel response values. In other words, if m=0, a matrix composed of $c_1(0)$ $H_1(0), c_1(1)H_1(2), c_1(2)H_1(4), c_2(0)H_2(0), c_2(1)H_2(2)$, and $c_2(2)H_2(4)$ is regarded as a channel response matrix used in the virtual multi-antenna technique in order to detect a signal.

Figure 6B:
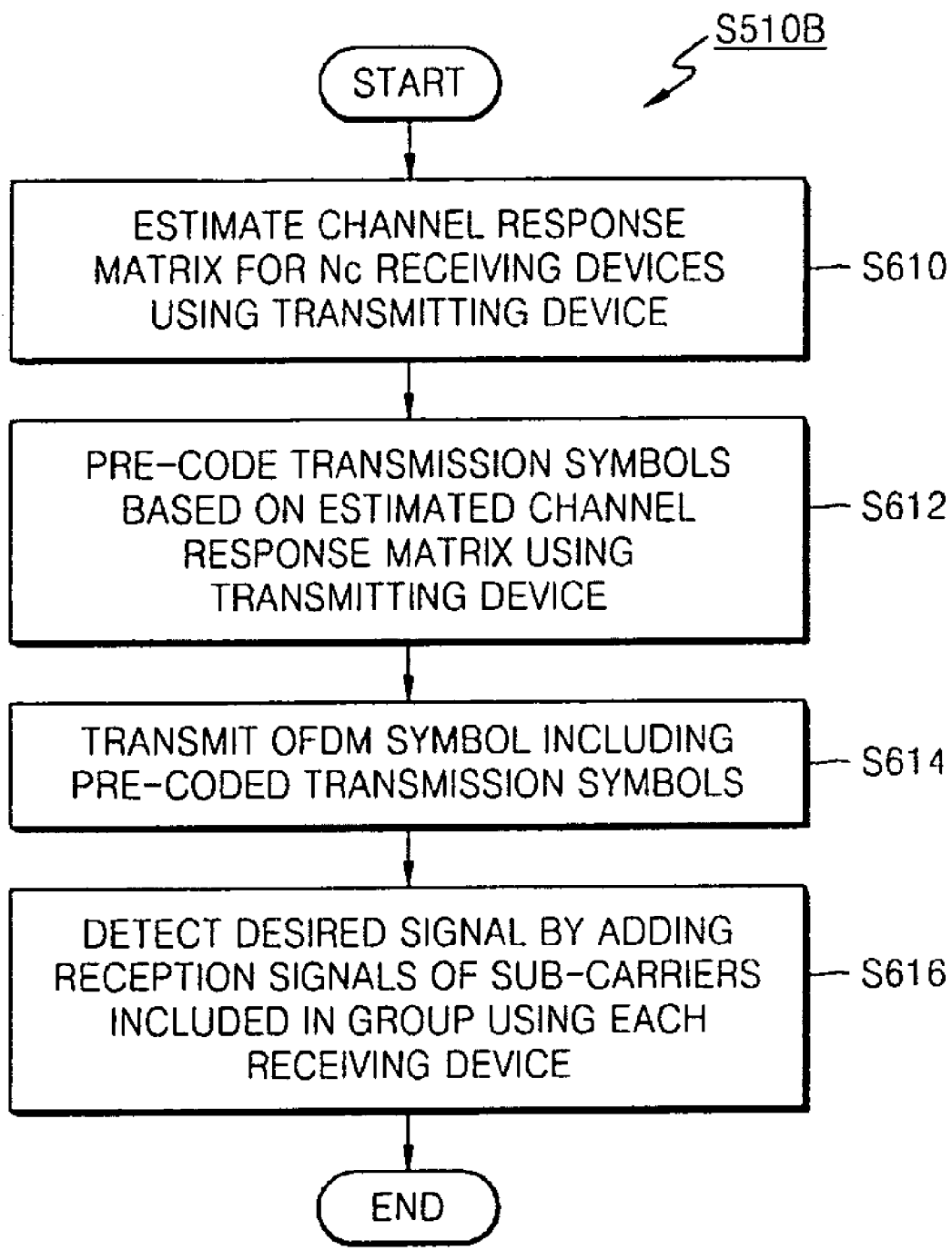

FIG. 6B is a detailed flowchart illustrating operation S510B of the technique illustrated in FIG. 5 according to another embodiment of the present invention. Specifically, FIG. 6B illustrates a method of transmitting a signal from a transmitting device to $N_c$ receiving devices using the virtual multi-antenna technique and detecting the signal using each of the receiving devices. In this case, the device A 300 illustrated in FIG. 3 is a transmitting device, and the devices B 310 and 320 are receiving devices. In addition, the multi-antenna technique applied here may be a pre-coding technique in which channels are pre-compensated. The following operations included in operation S510B will now be described with reference to FIGS. 6B and 3.

In operation S610, the device A 300, i.e., the transmitting device, calculates a channel response matrix $\overline{H}(m)$ composed of $\overline{H}_1(m)$ and $\overline{H}_2(m)$. The calculation process may be performed using various channel estimation algorithms, wherein the description of which is omitted in this disclosure.

In operation S612, the device A 300 pre-codes Nc (=2) transmission symbols based on the channel response matrix $\overline{H}(m)$ to pre-compensate for the channel effect and generates G (=3) pre-coded transmission symbols. The pre-coding process may be defined by Equation (11).

$$Z(m)=F(m)X(m), m\in\{0,1,\ldots,M-1\}, \quad (11)$$

where $F(m)$ indicates a $G\times N_c$ pre-coding matrix calculated using the channel response matrix $\overline{H}(m)$ basically composed of $\overline{H}_1(m)$ and $\overline{H}_2(m)$ detailed description of the pre-coding matrix will be described later. $X(m)$ indicates an $N_c\times 1$ vector and, among data to be transmitted to the devices B 310 and 320 included in an $m^{th}$ group, and includes transmission symbols $X_{1m}$ and $X_{2m}$ corresponding to the $m^{th}$ group. In other words, $Z(m)$ composed of G (=3) pre-coded transmission symbols can be achieved using Equation (11).

In operation S614, the device A 300 maps the pre-coded transmission symbols to G sub-channels, respectively, to generate an OFDM symbol and transmits the generated OFDM symbol to the devices B 310 and 320.

In operation S616, the device B 310 adds the reception signals of the G sub-channels included in the received OFDM symbol, and thus detects the transmission symbol $X_{1m}$. Similarly, the device B 320 detects the transmission symbol $X_{2m}$ through signal processing.

As the correlation between a channel corresponding to $\overline{H}_1(m)$ and a channel corresponding to $\overline{H}_2(m)$ increases, fewer benefits may be obtained from the virtual multi-antenna technique. Therefore, according to another embodiment of the present invention, an operation of randomizing channels may further be included in operation S510B as illustrated in FIG. 6B. In such a case, in operation S610, the device A 300 does not calculate $F(m)$ using the channel response matrix $\overline{H}(m)$ as the channel response matrix $\overline{H}(m)$ is. Instead, the device A 300 multiplies each element of the channel response matrix $\overline{H}_1(m)$ by a weight for randomizing channels and calculates $F(m)$ based on the multiplication result. The remaining processes are the same as those described above.

The concept of the present invention may be applied to an OFDM-based cellular system. In this case, the device A 300 or the devices B 310 or 320 may be a target base station, an adjacent base station, a target terminal, a terminal at the boundary of a cell, or a terminal of an adjacent cell. In the present specification, seven embodiments in which the present invention is applied to the OFDM-based cellular system will be described in order to specifically explain the basic concept of the present invention. However, the present invention may be embodied in various forms other than the seven embodiments to be described later by using diverse multi-antenna techniques. Hence, a virtual multi-antenna method according to the present invention is not limited to the seven embodiments that are to be described now.

The seven embodiments of the present invention are classified according to a virtual MIMO technique for a base station in uplink/downlink and a virtual MIMO technique for a terminal in downlink.

A first embodiment of the present invention is a virtual SDMA technique that is applied to an base station in uplink, and a second embodiment is a virtual MIMO detection technique in which an base station in uplink eliminates the interference of multiple users at the boundary of a cell. A third embodiment is a virtual smart antenna technique applied to an base station in uplink. A fourth embodiment is a virtual smart antenna technique in which an base station in uplink eliminates the interference of multiple users at the boundary of a cell. In addition, a fifth embodiment is a virtual SDMA technique using pre-compensation for a base station in downlink. These five embodiments are virtual MIMO techniques, which can be applied to all base stations. The five embodiments are used to reduce the interference of multiple users in a cell or the interference of multiple users at cell boundary, or to perform the SDMA technique. A sixth embodiment is a virtual MIMO detection technique applied to a terminal in downlink, and a seventh embodiment is a virtual MIMO technique that can be applied to all terminals. The sixth and seventh embodiments are used to reduce the inter-cell interference in a cellular system in which a frequency reuse coefficient is 1.

In another embodiment, a process of multiplying each element of a channel response matrix by a weight for independently modifying a channel response may be added to the above seven embodiments. If the virtual SDMA technique or the virtual MIMO detection technique is applied to this embodiment, a better system performance can be achieved, which will now be additionally described. In other words, better effects can be achieved by applying the multi-antenna technique based on the weight-reflected channel response matrix.

Figure 7A:
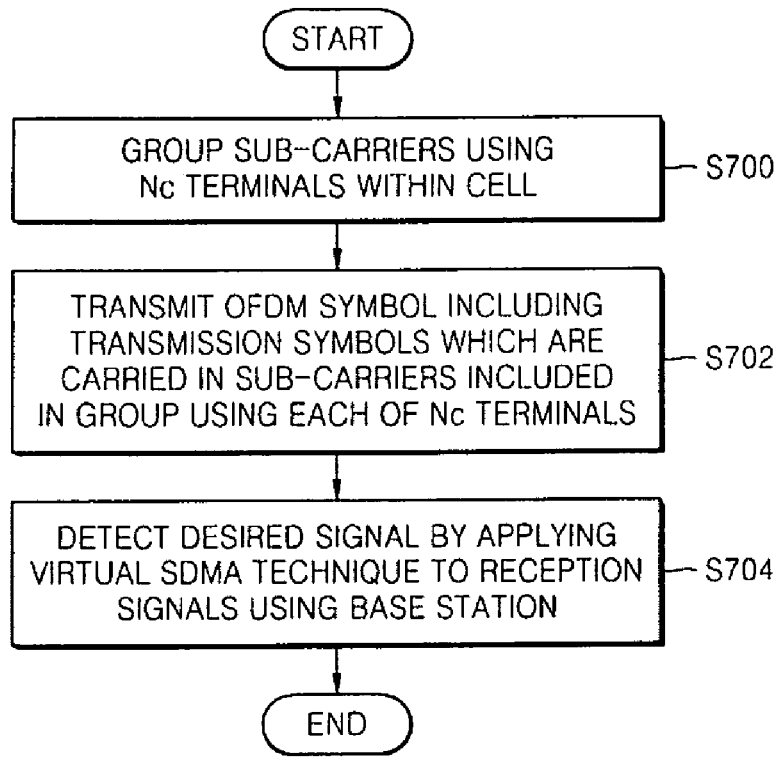
FIGS. 7A and 7B are a flowchart and a diagram, respectively, illustrating and explaining a virtual multi-antenna method for an uplink of an OFDM-based cellular system, according to an embodiment of the present invention.
Figure 7B:
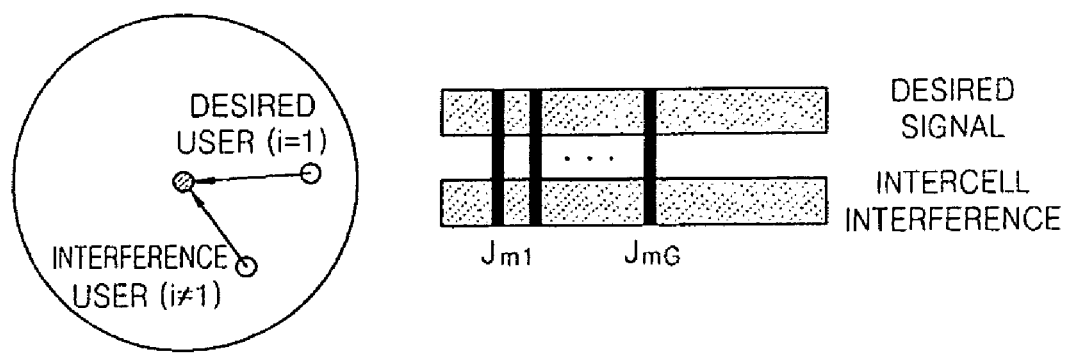

FIG. 7A is a flowchart illustrating a virtual multi-antenna method for an uplink of an OFDM-based cellular system according to an embodiment of the present invention. Specifically, a method of detecting signals of multiple users in a cell using the virtual SDMA technique according to an embodiment of the present invention is illustrated in FIG. 7A. FIG. 7B is a diagram illustrating a resource allocation structure in a frequency domain in order to explain the embodiment illustrated in FIG. 7A.

In operation S700, $N_c$ terminals in a cell group sub-carriers in the frequency domain of an OFDM symbol and generate at least one group including the G sub-carriers. In this case, $N_c \leq G$.

In operation S702, each of the $N_c$ terminals maps the transmission symbols to the G sub-carriers included in the group to generate an OFDM symbol and transmits the generated OFDM symbol to a base station.

In operation S704, the base station receives a signal defined by Equation (1) and detects a signal transmitted from a desired user using the virtual SDMA technique. In other words, the base station regards reception signals of the G sub-carriers included in the received signal as signals received by G virtual antennas and detects the signal transmitted from the desired user. Since the process of performing the virtual SDMA technique requires channel response values, operation S704 includes a channel estimation process.

In Equation (1), $X_1(k)$ and $X_i(k)$ ($i \neq 1$) indicate a transmission symbol transmitted from a terminal of a desired user and a transmission symbol transmitted from a terminal of an interference user, respectively. In addition, $H_i(k)$ indicates a frequency response of a channel formed between an $i^{th}$ terminal and the base station. $N_w(k)$ indicates AWGN with a mean of 0 and a dispersion of a $\sigma^2$. The reception signals of the G sub-carriers are defined by Equation (2), and Y(m), $\overline{H}(m)$, X(m) and $N_w(m)$ are defined by Equations (3) through (6), respectively. Furthermore, in Equation (4), $\overline{H}_i(m)$, which is an $i^{th}$ column vector of the channel coefficient matrix $\overline{H}(m)$ indicates a channel response of an $m^{th}$ group formed between the $i^{th}$ terminal and the base station and is defined by Equation (10). In Equation (4), if the channel corresponding to the $i^{th}$ column vector $\overline{H}_i(m)$ and the channel corresponding to $I^{th}$ ($I \neq i$) column vector $\overline{H}_j(m)$ are independent each other, a desired signal can be detected in operation S704 using the channel coefficient matrix $\overline{H}(m)$ and a linear detection technique or a non-linear detection technique. Examples of the linear detection technique include a least square (LS) technique, and a minimum mean square error (MMSE) technique. In addition, some examples of the non-linear detection technique include a parallel interference cancellation (PIC) technique, a successive interference cancellation (SIC) technique, and a maximum likelihood (ML) technique. However, the present invention is not limited thereto.

The linear detection technique is defined by Equation (12).

$$\hat{X}(m) = W(m) Y(m), \tag{12}$$

where a weight matrix W(m) of an $m^{th}$ resource (i.e. group) an Nc×G matrix. When the LS technique is used, the weight matrix W(m) is defined by Equation (13), and when the MMSE technique is used, the weight matrix W(m) is defined by Equation (14).

$$W(m) = \overline{H}(m)^\dagger = (\overline{H}(m)^* \overline{H}(m))^{-1} \overline{H}(m)^o, \tag{13}$$

$$W(m) = (\overline{H}(m)^* \overline{H}(m) + \sigma^2 I_G)^{-1} \overline{H}(m)^n, \tag{14}$$

where symbol '†' denotes a pseudo inverse matrix of a channel response, symbol '*' denotes a conjugate transpose matrix, and $\sigma^2$ denotes noise power when transmission power is 1. In the LS technique, the pseudo inverse matrix of a channel response is calculated without considering noise in order to null an interference signal. The MMSE technique considers noise and allows a demodulation signal to have a maximum signal-to-noise ratio (SNR). An $i^{th}$ row vector in the weight matrix W(m) calculated using Equation (13) or (14) has information for eliminating signals of the users except the desired user (i.e. ith user). Therefore, if the signal of the $i^{th}$ user is a target signal, the target signal can be detected by multiplying the $i^{th}$ row vector by the reception signal vector Y(m). When the signals of the interference users have to be detected as well, the weight matrix calculated using Equation (13) or (14) is multiplied by the reception signal vector Y(m). Consequently, $N_c$ user signals can all be detected.

A signal detection technique using the ML technique, which is an example of the non-linear detection technique, is defined by Equation (15).

$$\hat{X}(m) = \arg\min_{X(m)} \left( \sum_{g=1}^{G} \left| Y(J_{mg}) - \sum_{i=1}^{N_c} H_i(J_{mg}) \overline{X}_i(m) \right|^2 \right), \tag{15}$$

where $\overline{X}_i(m)$ indicates a transmission symbol that can be loaded by an $i^{th}$ user into a sub-channel of an $m^{th}$ group.

A signal received by a base station is composed of a sum of signals transmitted from a number of terminals via each channel, and there occurs a symbol timing offset between the transmitted signals. However, since a phase rotation component in the frequency domain, which is caused by the symbol timing offset, is estimated together with a channel response in the channel estimation process, the symbol timing offset does not decrease the system performance.

Figure 8A:
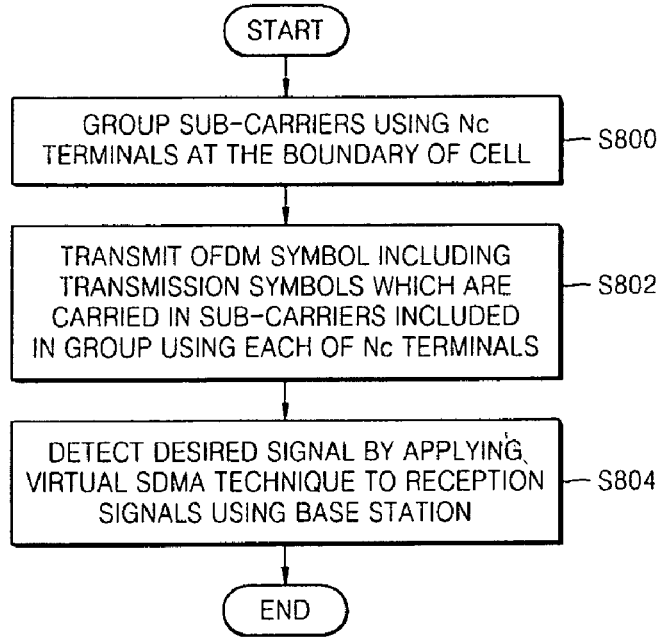
FIGS. 8A and 8B are diagrams illustrating and explaining, respectively, a virtual multi-antenna technique for the uplink of an OFDM-based cellular system according to another embodiment of the present invention.

FIG. 8A is a flowchart illustrating a virtual multi-antenna technique for the uplink of an OFDM-based cellular system according to another embodiment of the present invention.

Figure 8B:
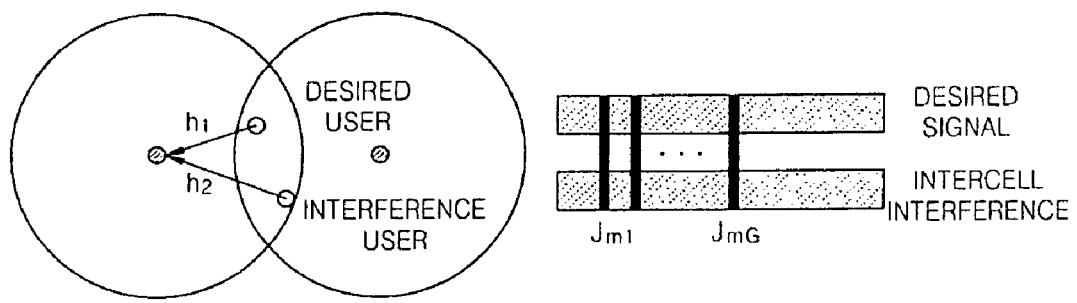

Specifically, a method of detecting signals of multiple users at the boundary of a cell using the virtual MIMO detection technique according to an embodiment of the present invention is illustrated in FIG. 8A. FIG. 8B is a diagram illustrating a resource allocation structure in the frequency domain in order to explain the embodiment illustrated in FIG. 8A. In the present embodiment, signals received by a base station are divided into interference signals of adjacent cells and signals of users in a cell using the virtual MIMO detection technique. The process of dividing the signals received by the base station will now be described.

In operation S800, $N_c$ terminals group sub-carriers in the frequency domain of an OFDM symbol and generate at least one group including G sub-carriers.

In operation S802, each of the $N_c$ terminals maps the transmission symbols to the G sub-carriers included in the group in order to generate an OFDM symbol and transmits the generated OFDM symbol to a base station.

In operation S804, the base station receives a signal defined by Equation (1) and detects a signal transmitted from a desired terminal using the virtual SDMA technique. In other words, the base station regards the reception signals of the G sub-carriers included in the received signal as signals received by G virtual antennas and detects the signal transmitted from the desired terminal. Since the process of performing the virtual SDMA requires a channel response value, operation S804 includes a channel estimation process. The embodiment illustrated in FIG. 8A is different from that of the embodiment illustrate in FIG. 7A in that the $N_c$ terminals using the resource corresponding to the same group are located at the boundary of a cell and the base station also has to estimate a channel response of all terminal of an adjacent cell using the resource corresponding to same group. Since the mathematical processes are identical to those in the embodiment illustrated in FIG. 7A, their description will be omitted.

Figure 9A:
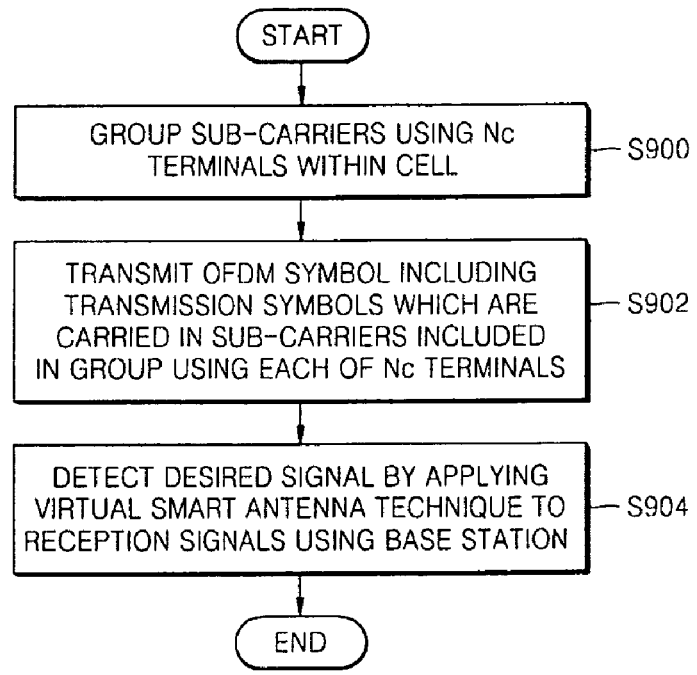
FIGS. 9A through 9C are diagrams illustrating and explaining, respectively, a virtual multi-antenna method for the uplink of an OFDM-based cellular system according to another embodiment of the present invention.
Figure 9B:
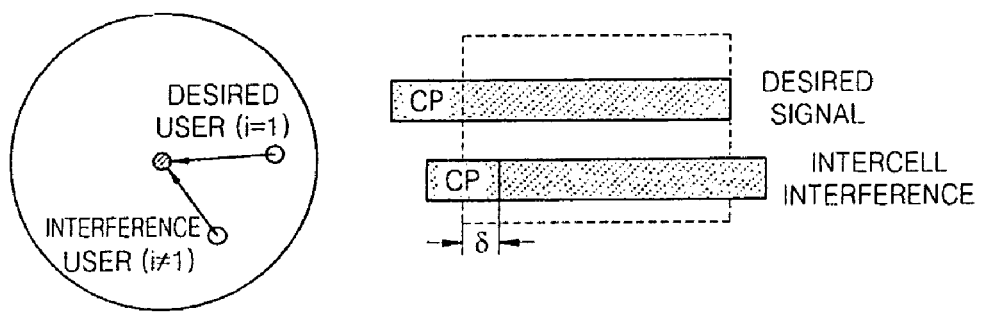

FIG. 9A is a flowchart illustrating a virtual multi-antenna method for the uplink of an OFDM-based cellular system according to another embodiment of the present invention. Specifically, a method of detecting signals of multiple users in a cell using the virtual smart antenna technique according to an embodiment of the present invention is illustrated in FIG. 9A. FIG. 9B is a diagram illustrating a resource allocation structure in the frequency domain to explain the embodiment illustrated in FIG. 9A. In the present embodiment, a base station eliminates the interference of multiple users or demodulates signals of multiple users simultaneously. A resource allocation method used for the present embodiment may be the cluster-type resource allocation method. The present embodiment will now be described with reference to FIG. 9A.

In operation S900, $N_c$ terminals in a cell group sub-carriers in the frequency domain of an OFDM symbol and generate at least one group including G sub-carriers.

In operation S902, each of the $N_c$ terminals maps transmission symbols to the G sub-carriers included in the group to generate an OFDM symbol and transmits the generated OFDM symbol to a base station.

In operation S904, the base station receives a signal defined by Equation (1) and detects a signal transmitted from a desired terminal using the virtual smart antenna technique. In other words, the base station regards reception signals of the G sub-carriers included in the received signal as signals received by G virtual antennas and detects the signal transmitted from the desired terminal. A desired signal $\hat{X}_{i\,1}(m)$ defined by Equation (16) is detected by calculating the weight vector w(m) of the virtual smart antenna technique.

$$\hat{X}_1(m) = w^H(m)Y(m), \quad (16)$$

A method of calculating a weight vector used in operation S904 may be a training signal-based technique or a symbol timing offset-based technique. The training signal-based technique does not require symbol timing offset estimation. However, an overhead occurs due to a training signal. Examples of the training signal-based technique include a least mean square (LMS) technique, a recursive least square (RLS) technique, and a sample matrix inversion (SMI) technique. The symbol timing offset-based technique requires symbol timing offset estimation. Examples of the symbol timing offset-based technique include a null-steering technique and a minimum variance distortionless response (MVDR) technique. In this specification, the description of the training signal-based technique will be omitted for convenience, and only part of the symbol timing offset-based technique will be described.

Figure 9C:
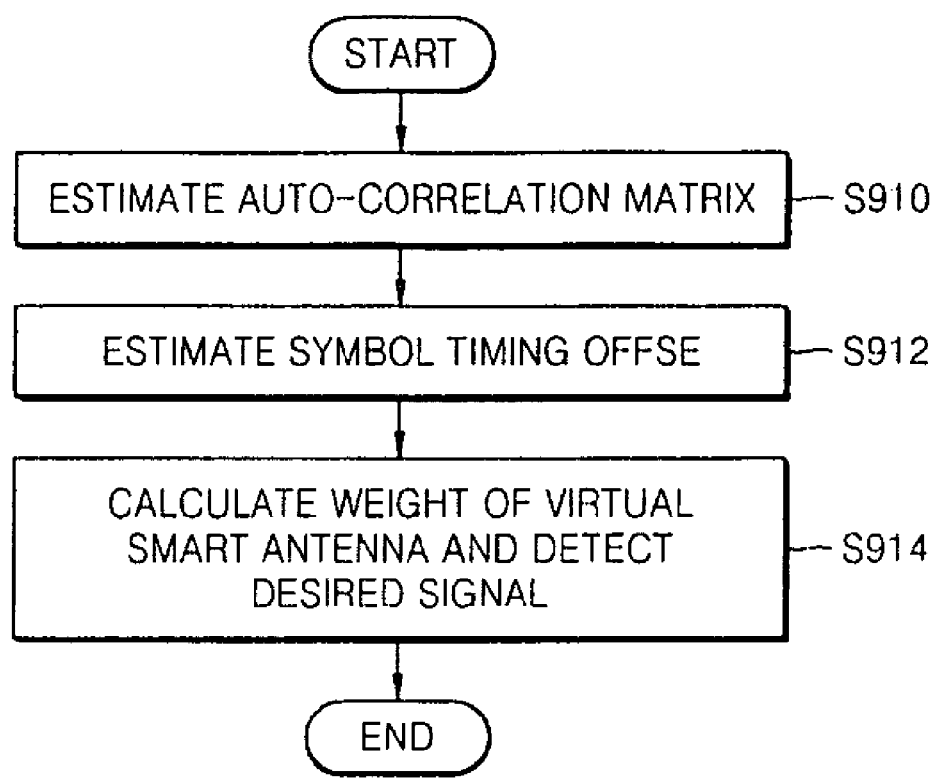

FIG. 9C is a detailed flowchart illustrating operation S904 of the method illustrated in FIG. 9A, in which the symbol timing offset-based technique is used.

In operation S910, a base station estimates an auto-correlation matrix R(m) of a vector which is composed of reception signals of the G sub-carriers. When the cluster-type resource allocation method is used, the $i^{th}$ column vector $\overline{H}_i(m)$ in Equation (4) may be rearranged into Equation (17).

$$\overline{H}_i(m) = [H_i(M \cdot m), H_i(M \cdot m+1), \ldots, H_i(M \cdot m+G-1)]^T \textcircled{x} a(\delta_i) g^{-j2m\delta_i} M \cdot m + N$$

$$\text{where } a(\delta_i) = [1, e^{-j2m\delta_i 1N}, \ldots, e^{-j2m\delta_i (G-1)jN}]^T \quad (17)$$

where $H_i(J_{mg})$ indicates a channel response value when a symbol timing offset does not occur, and $a(\delta_i)$ indicates a steering vector formed by a symbol timing offset $\delta_i$. In addition, $\textcircled{x}$ indicates a Hadamard multiplication. In the case of a quasi-static fading channel, the auto-correlation matrix R(m) of a reception signal vector of an $m^{th}$ group is defined by Equation (18).

$$R(m) = E[Y(m)Y^H(m)] \quad (18)$$
$$= \tilde{H}(m) R_X(m) \tilde{H}^H(m) + \sigma^2 I_G$$
$$\text{where } R_X(m) = E[X(m)X^H(m)],$$

where $R_x(m)$ indicates an auto-correlation matrix of a transmission signal vector. If there is no correlation between transmission signals of multiple users and if the transmission signal of each user has an equal average power $\sigma_x^2$, $R_x(m)$ is $\sigma_x^2 I_{Nc}$, and R(m) is simplified into Equation (19).

$$R(m) = \sigma_x^2 \overline{H}(m) \overline{H}^H(m) + \sigma^2 I_G \quad (19).$$

In other words, according to the method of estimating the auto-correlation matrix R(m) based on Equation (19), the auto-correlation matrix R(m) is estimated using the fact that the effect of the symbol timing offset on the reception signals is represented as phase rotation between adjacent sub-carriers.

In operation S912, the base station estimates the symbol timing offset between terminals. An example of a symbol timing offset estimation method is an estimation of signal parameters via rotational invariance technique (ESPIRIT) in which various directions of arrival estimation (DoA) techniques are applied to the conventional smart antenna technique. For convenience, a symbol timing offset estimation method using a multiple signal classification (MUSIC) technique, which is one of the subspace-based techniques, will be described in this disclosure, and the description of other estimation techniques will be omitted.

In the MUSIC technique, if G is greater than $N_c$, the symbol timing offset is estimated by searching for a peak position while changing the symbol timing offset in a MUSIC spectrum as obtained by Equation (20).

$$P_m(\delta) = \frac{a^H(\delta)a(\delta)}{a^H(\delta)V(m)V^H(m)a(\delta)}, \quad (20)$$

where, if there is no correlation between user signals, a $G \times (G-N_c)$ matrix composed of unique vectors in a noise space is defined by $[q_{Nc}(m), \ldots, q_{G-1}(m)]$. In this case, $q_j(m)$ denotes a $j^{th}$ noise subspace corresponding to an eigenvalue of R(m) that is close to a noise dispersion $\sigma^2$. A steering vector $a(\delta_i)$ where the symbol timing offset is almost orthogonal to the noise subspace $q_j(m)$. Due to such orthogonality, a denominator in Equation (2) is minimized to a symbol timing of $\delta = \delta_i$. Consequently, $P_m(\delta)$ has $N_c$ peak values.

In operation S914, a desired signal is detected using the weight of a virtual smart antenna calculated based on the estimated auto-correlation matrix and the symbol timing offset.

The null-steering technique will now be described as an example of the weight calculation technique used in operation S914. If the base station estimates the symbol timing offsets between the OFDM signals received from the $N_c$ users, a weight vector in the null-steering technique is defined by Equation (21).

$$w(m)^H = e^T P^\dagger, \quad (21)$$

where e, which is a G×1 vector, and P, which is a G×$N_c$ matrix, are defined by e=[1, 0, . . . , 0] and P=[a($\delta_1$), . . . , a($\delta_{Nc}$)], respectively. The symbol timing offset $\delta_i$ required in the null-steering technique is a value obtained in operation S912.

An MVDR technique will now be described as another example of the weight calculation technique. Under a condition where the power of a desired reception signal is 1, and a weight vector that maximizes a signal-to-interference ratio (SINR) may be obtained after the average power of the reception signals is minimized using Equation (22).

$$w(m) = \frac{P^{-1}(m)a(\delta_0)}{a^H(\delta_0)R^{-1}(m)a(\delta_0)}. \quad (22)$$

In this case, the symbol timing offset is obtained in operation S912, and the auto-correlation matrix is obtained in operation S910.

Figure 10A:
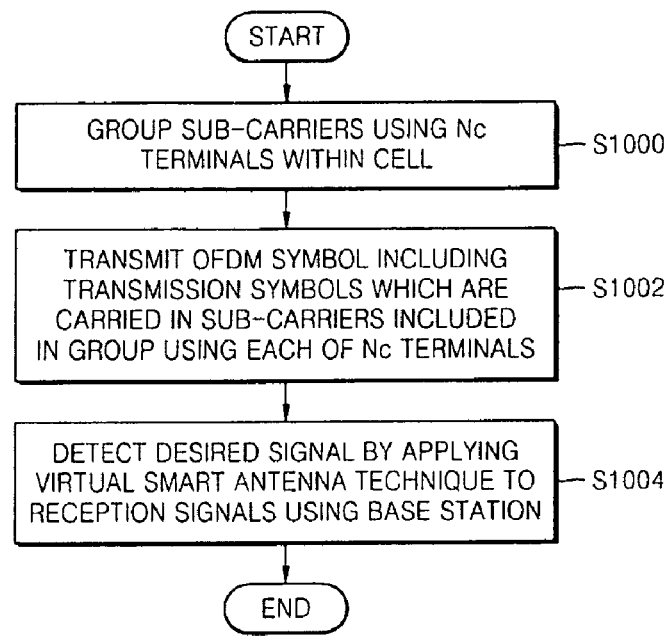
FIGS. 10A and 10B are diagrams illustrating and explaining, respectively, a virtual multi-antenna technique for the uplink of an OFDM-based cellular system according to another embodiment of the present invention.
Figure 10B:
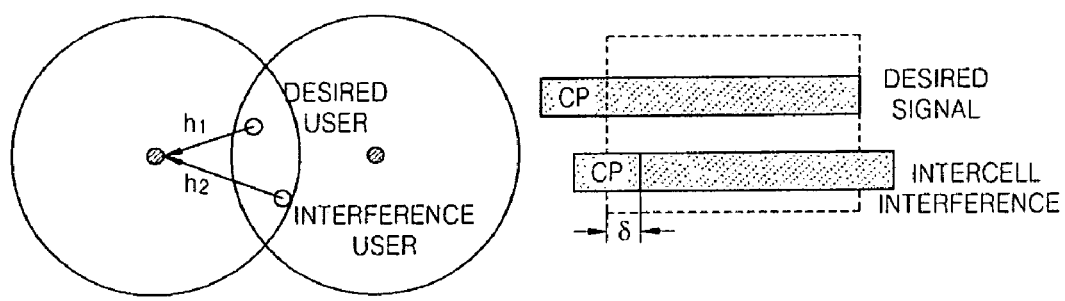

FIG. 10A is a flowchart illustrating a virtual multi-antenna technique for the uplink of an OFDM-based cellular system according to another embodiment of the present invention. Specifically, a virtual smart antenna technique eliminates the interference of multiple users at the boundary of a cell, according to an embodiment of the present invention as illustrated in FIG. 10A. FIG. 10B is a diagram illustrating a resource allocation structure in the frequency domain in order to explain the embodiment illustrated in FIG. 10A.

In the present embodiment, a base station eliminates the interference of multiple users or demodulates signals of multiple users simultaneously. In the present embodiment, signals that are received by a base station are divided into interference signals of adjacent cells and signals of users in a cell using the virtual smart antenna technique. The present embodiment will now be described with reference to FIG. 10A.

In operation S1000, $N_c$ terminals at the boundary of a cell group sub-carriers in the frequency domain of an OFDM symbol and generate at least one group including G sub-carriers.

In operation S1002, each of the $N_c$ terminals maps transmission symbols to the G sub-carriers included in the group to generate an OFDM symbol and transmits the generated OFDM symbol to a base station.

In operation S1004, the base station receives a signal defined by Equation (1) and detects a signal transmitted from a desired terminal using the virtual smart antenna technique. In other words, the base station regards the reception signals of the G sub-carriers included in the received signal as signals received by G virtual antennas and detects the signal transmitted from the desired terminal. A desired signal $\overline{X}_{i-1}(m)$ defined by Equation (16) is detected by calculating the weight vector w(m) of the virtual smart antenna technique.

The embodiment illustrated in FIG. 10A is different from the embodiment illustrated in FIG. 9A in that $N_c$ terminals using the channel corresponding to the same group are located at cell boundary and that a base station also has to estimate a channel response of a terminal of an adjacent cell which uses a resource corresponding the same group. Since the mathematical processes are identical to those as in the embodiment illustrated in FIG. 9A, their description will be omitted.

The virtual SDMA technique and the virtual smart antenna technique have been described above as the virtual multi-antenna techniques which can be used for a base station in uplink according to an embodiment of the present invention. The virtual SDMA technique can use all resource allocation methods like those illustrated in FIGS. 4A through 4C. When using the comb-type and random-type resource allocation methods, the virtual SDMA technique can obtain a diversity gain. Even when the transmission symbols in a cell are synchronized, since the phase rotation caused by a symbol timing offset is estimated in the channel estimation process, a decrease in performance can be prevented. In the virtual smart antenna technique, the symbol timing offset between multiple users in a cell or at the boundary of a cell is estimated. Then, a virtual beam is formed to eliminate the interference of multiple users. The cluster-type resource allocation method may be used in the virtual smart antenna technique. Both the virtual SDMA technique and the virtual smart antenna technique can eliminate the interference of multiple users and simultaneously demodulate the signals transmitted from multiple users.

Figure 11A:
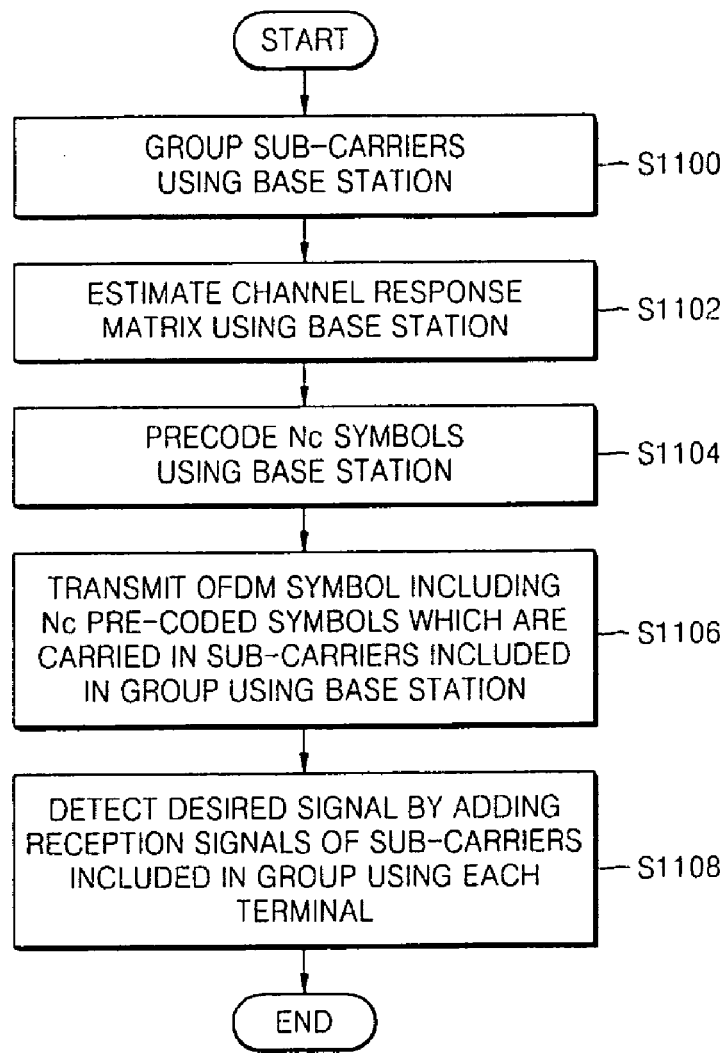
FIGS. 11A through 11C are diagrams illustrating and explaining, respectively, a virtual multi-antenna method for a downlink of an OFDM-based cellular system according to an embodiment of the present invention.
Figure 11B:
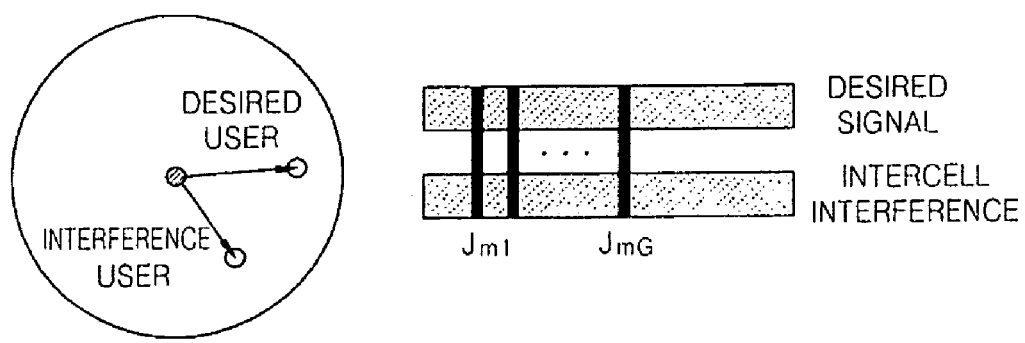
Figure 11C:
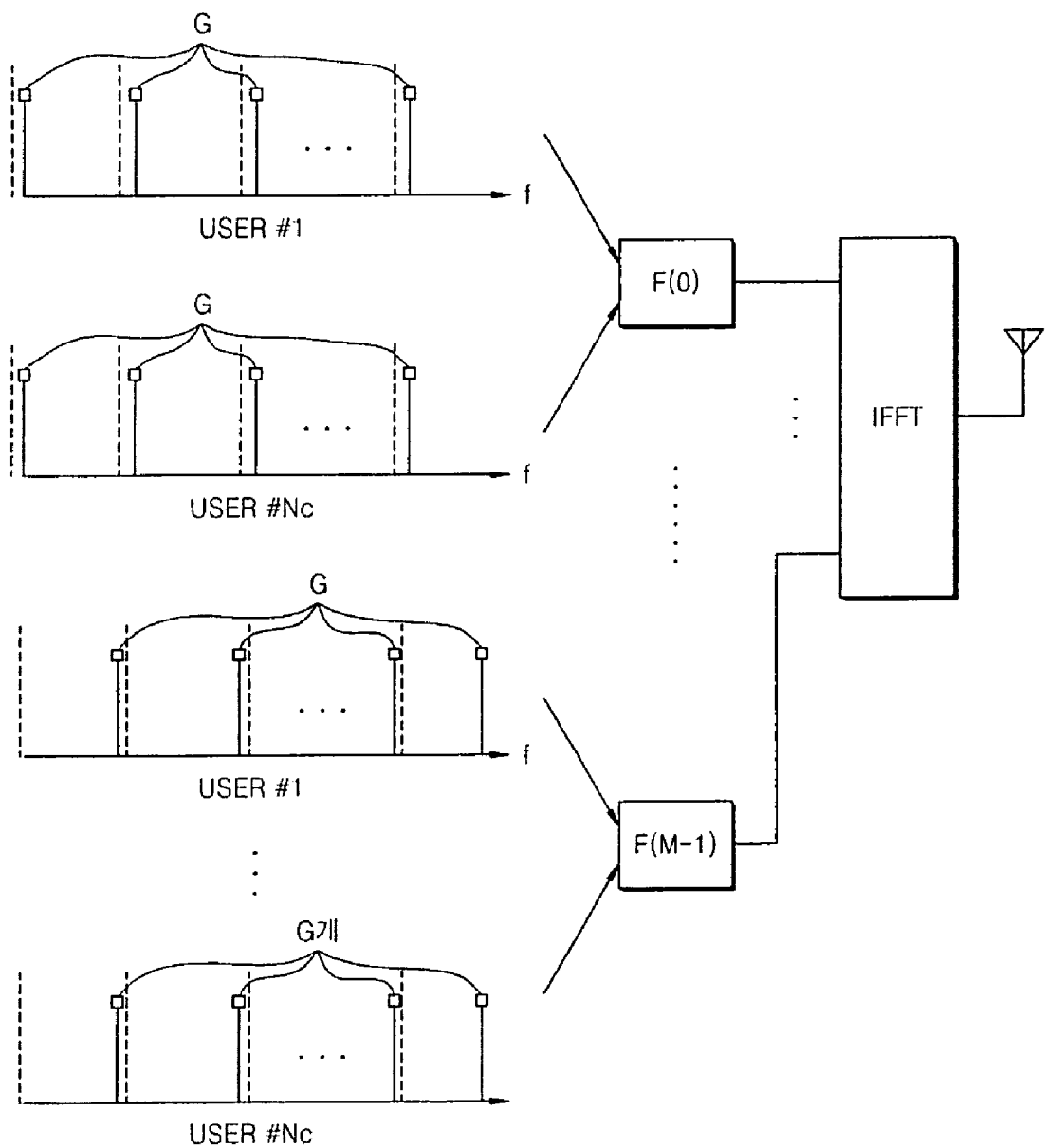

FIG. 11A is a flowchart illustrating a virtual multi-antenna technique for a downlink of an OFDM-based cellular system according to an embodiment of the present invention. Specifically, a virtual SDMA technique that is applied to a downlink base station according to an embodiment of the present invention is illustrated in FIG. 11A. FIG. 11B is a diagram illustrating a resource allocation structure in the frequency domain to explain the embodiment illustrated in FIG. 11A. FIG. 11C is a diagram for explaining a pre-coding process performed by a base station.

The virtual SDMA technique can be applied to the downlink of the OFDM-based cellular system as well as to the uplink of the OFDM-based cellular system. The process of applying the virtual SDMA technique to the downlink of the OFDM-based cellular system will now be described with reference to FIG. 11A.

In operation S1100, a base station groups sub-carriers of an OFDM symbol and generates at least one group including G sub-carriers.

In operation S1102, the base station calculates a channel response matrix $\bar{H}(m)$ for the G sub-carriers between $N_c$ terminals and the base station.

In operation S1104, the base station pre-codes $N_c$ symbols as defined by Equation (11) based on the channel response matrix $\bar{H}(m)$ and thus pre-compensates for the effects of the downlink channels.

In operation S1106, the base station maps the $N_c$ pre-coded symbols to the G sub-carriers in order to generate an OFDM symbol and transmits the generated OFDM symbol to the $N_c$ terminals. A vector U(m) that is composed of multi-user reception signals, which passed through the downlink, is defined by Equation (24).

$$U(m) = \tilde{H}^T(m)Z(m) + N_w(m), m \in \{0, 1, \ldots, M-1\} \quad (24)$$
$$= \tilde{H}^T(m)F(m)Z(m) + N_w(m),$$

where a transmission signal vector Z(m) of an $m^{th}$ group and a multi-user reception signal U(m) of the $m^{th}$ group are defined by Equation (25).

$$Z(m)=[Z(J_{m1}),Z(J_{m2}),\ldots,Z(J_{mG})]^T$$
$$U(m)=[U_1(m),U_2(m),\ldots,U_{N_c}(m)]^T, \quad (25)$$

where a $g^{th}$ transmission signal $Z(J_{mg})$ of an $m^{th}$ group indicates a signal obtained after $N_c$ pre-coded signals are added, and $U_i(m)$ indicates a reception signal of an $i^{th}$ user in the $m^{th}$ group. By selecting a matrix F(m) which causes $\tilde{H}^T(m)F(m)$ to become a unit matrix, the virtual SDMA technique can be applied to the downlink. The matrix F(m) may be obtained using the linear/non-linear technique including a zero forcing (ZF) technique, an orthogonalization technique, a dirty paper coding (DPC) technique, and a Tomlinson-Harashima pre-coding (THP) technique. If, for example, the ZF technique is applied, the matrix F(m) is defined by Equation (26).

$$F(m) = \begin{cases} \left(\tilde{H}^T(m)\right)^\dagger & \text{if } N_c < G \\ \left(\tilde{H}^T(m)\right)^{-1} & \text{if } N_c = G. \end{cases} \quad (26)$$

In other words, the downlink base station can perform the virtual SDMA technique by pre-coding the Nc transmission signals using a inverse matrix or a pseudo inverse matrix of a channel coefficient matrix $\bar{H}^T(m)$ corresponding to the mth group.

In operation S1108, each of the $N_c$ terminals adds the reception signals of the G sub-carriers and detects a signal.

If the present embodiment is applied to the comb-type or random-type resource allocation method, the diversity gain can be obtained.

Figure 12A:
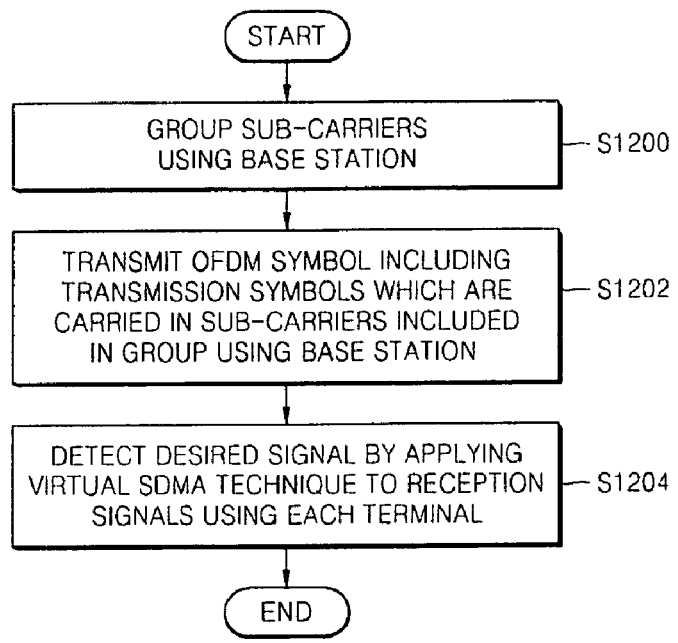
FIGS. 12A and 12B are diagrams illustrating and explaining, respectively, a virtual multi-antenna technique for the downlink of an OFDM-based cellular system according to an embodiment of the present invention.
Figure 12B:
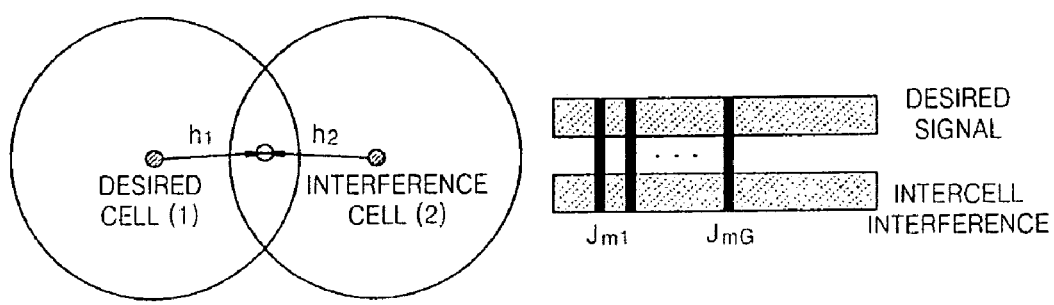

FIG. 12A is a flowchart illustrating a virtual multi-antenna technique for the downlink of an OFDM-based cellular system according to an embodiment of the present invention. Specifically, a virtual MIMO detection technique that is applied to a terminal in downlink according to an embodiment of the present invention is illustrated in FIG. 12A. FIG. 12B is a diagram for explaining the embodiment illustrated in FIG. 12A. Referring to FIG. 12B, in a cellular system whose frequency reuse coefficient is 1, if a terminal is at the boundary of a cell, there may be interference between a signal transmitted from an adjacent cell and a signal transmitted from a desired cell. In this case, the interference between the cells can be eliminated using the virtual MIMO detection technique. The virtual MIMO detection technique uses the spatial characteristics of a channel frequency response and configures the resources in a similar manner to the virtual SDMA technique that is applied to the base station in uplink described in the embodiment illustrated in FIG. 7A.

The present embodiment will now be described with reference to FIG. 12A. In operation S1200, $N_c$ base stations group sub-carriers of an OFDM symbol using a grouping method common to the $N_c$ base stations and generates at least one group including G sub-carriers.

In operation S1202, each of the $N_c$ base stations maps symbols that are to be transmitted to a terminal included in a cell of the base station to the G sub-carriers in order to generate an OFDM symbol and transmits the generated OFDM symbol to the terminal.

In operation S1204, the terminal detects a signal transmitted from the cell to which the terminal belongs using the virtual SDMA technique. In other words, the terminal regards reception signals of the G sub-carriers as signals received by G virtual antennas and detects the signal transmitted from the cell.

The present embodiment is similar to that illustrated in FIG. 7A in mathematical aspects. However, the difference between the two embodiments is that $N_c$ in the present embodiment indicates the number of adjacent cells, and $\bar{H}_i(m)$ indicates a channel response between an $i^{th}$ base station and the terminal. Since the mathematical processes are identical to those in the embodiment illustrated in FIG. 7A, their description will be omitted.

Figure 13A:
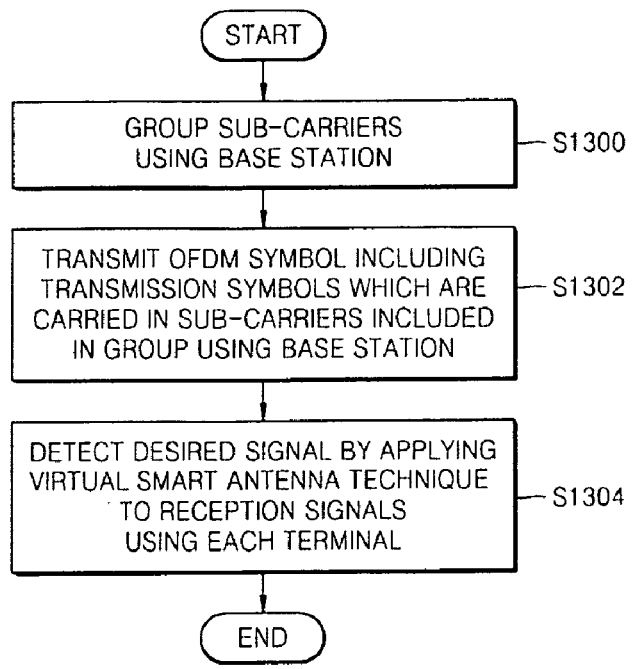
FIGS. 13A and 13B are diagrams illustrating and explaining, respectively, a virtual multi-antenna method for the downlink of an OFDM-based cellular system according to another embodiment of the present invention.
Figure 13B:
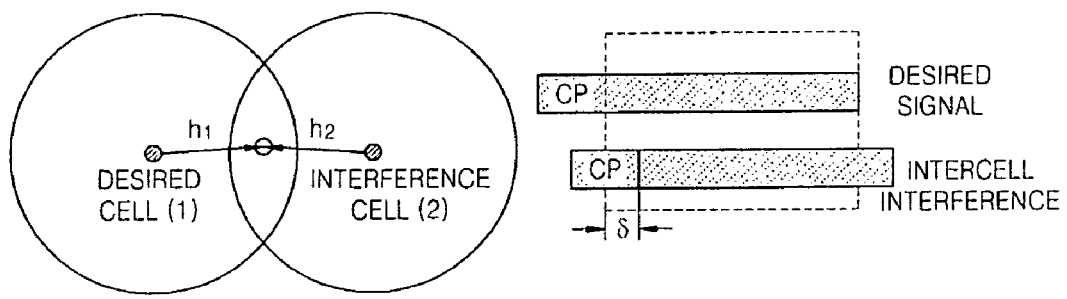

FIG. 13A is a flowchart illustrating a virtual multi-antenna technique for the downlink of an OFDM-based cellular system according to another embodiment of the present invention. Specifically, a virtual smart antenna technique, which can be applied to a downlink terminal and can eliminate the interference between cells, according to an embodiment of the present invention, is illustrated in FIG. 13A. FIG. 13B is a diagram for explaining the embodiment illustrated in FIG. 13A. Referring to FIG. 13B, in a cellular system whose frequency reuse coefficient is 1, a signal received by a terminal at the boundary of a cell has a symbol timing offset due to the signal transmission delay of each base station. Using such characteristics, the virtual smart antenna technique may be applied to each terminal in a similar way as in the embodiment illustrated in FIG. 9A.

The present embodiment will now be described with reference to FIG. 13A. In operation S1300, $N_c$ base stations group sub-carriers of an OFDM symbol using a grouping method common to the $N_c$ base stations and generate at least one group including G sub-carriers.

In operation S1302, each of the $N_c$ base stations maps symbols that are to be transmitted to a terminal included in a cell of the base station to the G sub-carriers in order to generate an OFDM symbol and transmits the generated OFDM symbol to the terminal included in the cell of the base station.

In operation S1304, the terminal detects a signal transmitted from the cell to which the terminal belongs using the virtual smart antenna technique. In other words, the terminal regards reception signals of the G sub-carriers as signals received by G virtual antennas and detects the signal transmitted from the cell.

The present embodiment is similar to the embodiment illustrated in FIG. 9A in terms of mathematical aspects. However, the difference between the two embodiments is that $N_c$ in the present embodiment indicates the number of adjacent cells, and $\overline{H}_i(m)$ indicates a channel response between an $i^{th}$ base station and the terminal. Since the mathematical processes are identical to those in the embodiment illustrated in FIG. 9A, their description will be omitted.

The virtual multi-antenna technique of an OFDM-based cellular system according to the seven embodiments of the present invention has been described above.

As the correlation between channels decreases, the effects of the present invention increases. In other words, if there is a correlation between the channel responses of the devices, the virtual SDMA technique or the virtual MIMO detection technique according to the present invention may not be able to obtain the maximum diversity gain or effectively eliminate an interference signal. Therefore, another embodiment of the present invention may further add the operation of randomizing channels to the seven embodiments described above, thereby maximizing the effect of the present invention. In other words, a virtual signature randomizer (VSR) technique may be used in another embodiment of the present invention. According to the VSR technique, a transmitting/receiving end multiplies a transmission symbol or an estimated channel response value by a predetermined weight such that channel responses of the devices are independent of one another. In the VSR technique, the transmitting/receiving end does not apply the virtual multi-antenna technique based on a physical channel response itself. Instead, the transmitting/receiving end applies the virtual multi-antenna technique based on a weight-reflected channel response.

Figure 14A:
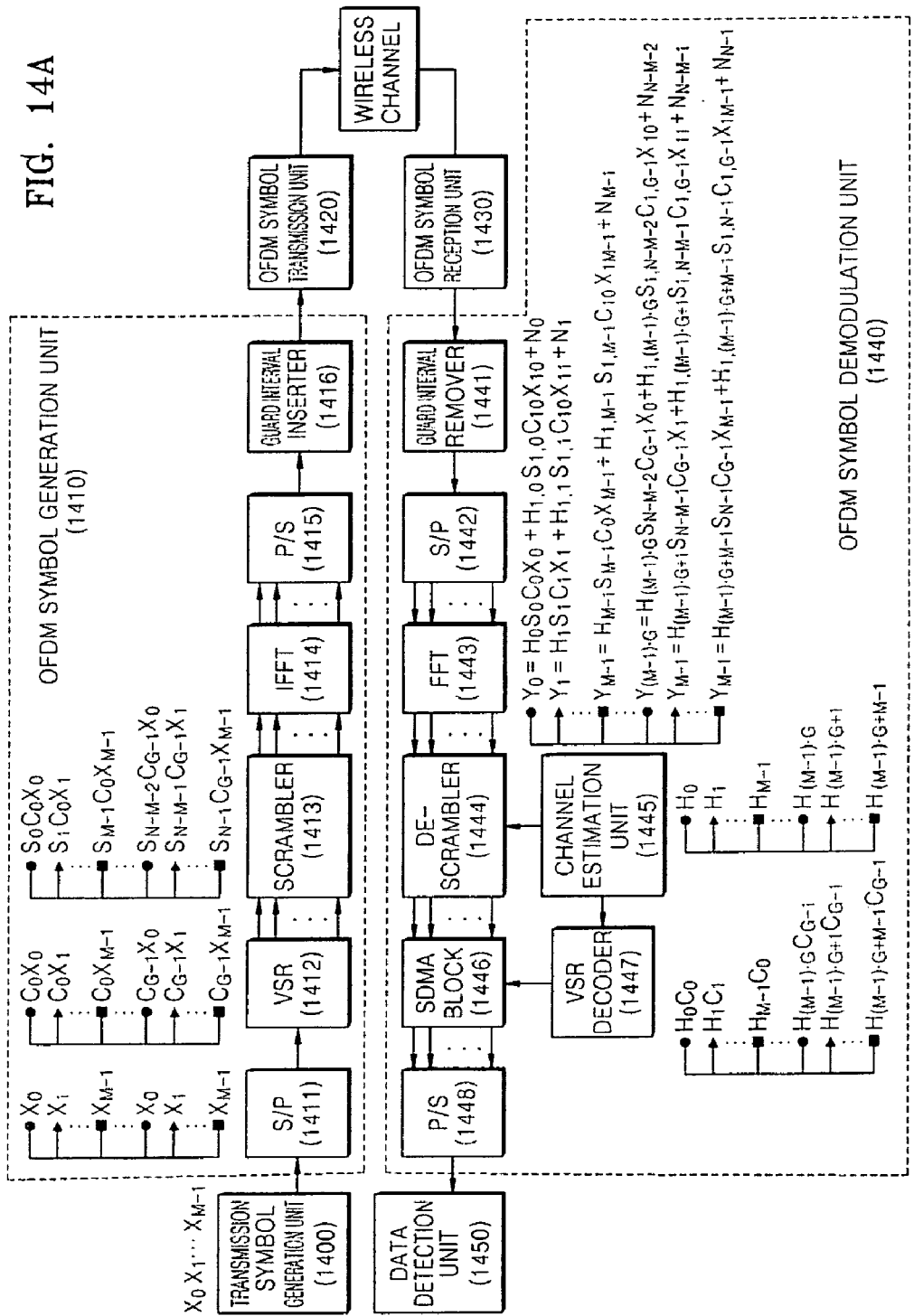
FIGS. 14A and 14B are block diagrams illustrating OFDM cellular systems using a virtual signature randomizer (VSR) technique and a virtual multi-antenna technique according to an embodiment of the present invention.

FIG. 14A is a block diagram of an OFDM cellular system using the VSR technique and the virtual multi-antenna technique according to an embodiment of the present invention. In other words, FIG. 14A illustrates a process of randomizing channel responses by applying the VSR technique to the OFDM cellular system according to an embodiment of the present invention. The present embodiment will now be described with reference to FIG. 14A based on the assumption that a system including an interference signal of an interference device detects a signal transmitted from a target device.

Referring to FIG. 14A, like the OFDM cellular system illustrated in FIG. 1, the OFDM cellular system according to the present embodiment includes a transmitting end and a receiving end. The transmitting end includes a transmission symbol generation unit 1400, an OFDM symbol generation unit 1410, and an OFDM symbol transmission unit 1420. The receiving end includes an OFDM symbol reception unit 1430, an OFDM symbol demodulation unit 1440, and a data detection unit 1450.

Like the transmission symbol generation unit 100 illustrated in FIG. 1A, the transmission symbol generation unit 1400 generates transmission symbols that are to be carried in a channel (sub-channel). The present embodiment will be described based on the assumption that M groups including G sub-carriers are generated as a result of the grouping process according to the present invention. In this case, the transmission symbol generation unit 1400 generates a transmission symbol sequence $X_0, X_1, \ldots, X_{M-1}$ in order to transmit an OFDM symbol.

The OFDM symbol generation unit 1410 generates an OFDM symbol including the transmission symbol sequence $X_0, X_1, \ldots, X_{M-1}$. The OFDM symbol generation unit 1410 is different from the OFDM symbol generation unit 110 illustrated in FIG. 1 in that the OFDM symbol generation unit 1410 further includes a VSR 1412 and a scrambler 1413. The scrambler 1413 multiplies the generated transmission symbol by a predetermined scrambling code in order to randomize the signals between cells in a cellular system. If the scrambler 1413 is not applied to the cellular system or if the cellular system does not require scrambling, the scrambler 1413 may be omitted. In other words, according to the present embodiment, a code of the scrambler 1413 and a weight of the VSR 1412 can be reflected in a channel response in order to perform SDMA demodulation or the virtual MIMO detection.

The functions and operations of an S/P 1411, an IFFT 1414, a P/S 1415, and a guard interval inserter 1416 are identical to those of the S/P 111, the IFFT 112, the P/S 113, and the guard interval inserter 114 illustrated in FIG. 1, and thus their description will not be repeated.

The VSR 1412 multiplies an allocated channel randomization code by each of transmission symbols that are to be carried in each resource (sub-carrier). In FIG. 14A, the VSR 1412 is placed before the scrambler 1413. However, the VSR 1412 may be placed after the scrambler 1413. The allocated channel randomization code indicates a weight sequence for randomizing channels as described above. In the embodiment illustrated in FIG. 14A, it is assumed that a target user is allocated a channel randomization code $c_0, c_1, \ldots, c_{G-1}$, and an interference user is allocated a channel randomization code $c_{10}, c_{11}, \ldots, c_{1G-1}$. The VSR 1412 multiplies each of transmission symbols $X_0, X_1, \ldots, X_{M-1}, X_0, X_1, \ldots, X_{M-1}, \ldots, X_0, X_1, \ldots, X_{M-1}$ that are to be carried in each resource (sub-carrier) by a channel randomization code $C_0, \ldots, C_0, C_1, \ldots, C_1, \ldots, C_{G-1}, \ldots, C_{G-1}$. In FIG. 14A, it is assumed that the comb-type resource allocation method is used and respective groups of users use the same channel randomization code. However, in the present invention, other resource allocation methods may also be used, and each of the M groups may use a different channel randomization code.

Equation (27) defines an example of a weight used by the VSR 1412.

$$c_i(n) = \exp(j\pi/4 \cdot \text{rand}(i,n)), \text{rand}(I,n) \in \{0, 1, \ldots, 8\} \quad (27)$$

In Equation (27), $c_i(n)$ indicates a weight by which an $n^{th}$ resource of an $i^{th}$ user is multiplied, and rand (i, n) has a value of 0 to 8. In other words, if Equation (27) is used, $C_0, C_1, \ldots, C_{G-1}$ has a value of $c_1(0), c_1(1), \ldots, c_1(G-1)$. In Equation 27, a weight of 8-phase shift keying (PSK) is used as an example. However, the present invention is not limited thereto.

The scrambler 1413 multiplies each input symbol by a scrambling code $S_n$. In FIG. 14A, it is assumed that a scrambling code $S_{1,n}$ is allocated to an interference user.

The functions and operations of the OFDM symbol transmission unit 1420 and the OFDM symbol reception unit 1430 are identical to those of the OFDM symbol transmission unit 120 and the OFDM symbol reception unit 130 illustrated in FIG. 1, and thus their description will not be repeated.

In FIG. 14A, a channel response value in the frequency domain between a receiving end and a target device is indicated by $H_n$, and a channel response value in the frequency domain between the receiving end and an interference device is indicated by $H_{1,n}$.

The OFDM symbol demodulation unit 1440 detects a signal $\hat{X}_0, \hat{X}_1, \ldots \hat{X}_{M-1}$ corresponding to the transmission symbol $X_0, X_1, \ldots, X_{M-1}$ and provides the detected signal $\hat{X}_0, \hat{X}_1, \ldots \hat{X}_{M-1}$ to the data detection unit 1450. The OFDM symbol demodulation unit 1440 is different from the OFDM symbol demodulation unit 140 illustrated in FIG. 1 in that it further includes a de-scrambler 1444 and a VSR demodulation unit 1447. For the convenience of the description, the OFDM symbol demodulation unit 1440 includes a channel estimation unit 1445 instead of the synchronization & channel estimation unit 146 of the embodiment illustrated in FIG. 1. Also, the OFDM symbol demodulation unit 1440 includes an SDMA block 1446 that performs signal detection using the virtual multi-antenna technique according to the present invention instead of the equalizer 144 illustrated in FIG. 1.

The de-scrambler 1444 performs a reverse process of the process performed by the scrambler 1413. A VSR demodulation unit 1447 multiples a channel response value of a target user estimated by the channel estimation unit 1445 by the channel randomization code multiplied in the transmitting end and provides the multiplication result to the SDMA block 1446.

A channel matrix $\overline{H}_{c_i}(m)$ used in the virtual SDMA demodulation or virtual MIMO detection and output from the VSR demodulation unit 1447 is defined by Equation (28).

$$\overline{H}_{c_i}(m) = [c_i(J_{m1})H_i(J_{m1}), c_i(J_{m2})H_i(J_{m2}), \ldots, c_1(J_{mG}) H_1(J_{mG})]^T, \quad (28)$$

where indicates $\overline{H}_{c_i}(m)$ indicates a channel response of an $i^{th}$ user and corresponds to $[H_m C_0, H_{M+m} C_1, \ldots, H_{M(G-1)+m} C_{G-1}]^T$ as illustrated in FIG. 14A. Although a physical channel has not been changed, the SDMA demodulation or the virtual MIMO detection is performed using the channel response including the multiplied weight. Therefore, when the cluster-type resource allocation method, in which subcarrier channel responses $H_i(J_{mg})$ within a group are generally similar to one another, is used, there is a low possibility that the diversity gain can be obtained. However, if the VSR process is added to the virtual multi-antenna technique that uses the cluster-type resource allocation method, the channel responses $c_i(J_{mg})H_i(J_{mg})$ in a group are independent of one another. Hence, the diversity gain can be obtained.

Consequently, the SDMA block 1446 detects a desired signal from a signal composed of the sum of the respective signals of the users, which passed through a randomized channel, and outputs $\hat{X}_0, \hat{X}_1, \ldots \hat{X}_{M-1}$ as the detection result.

The functions and operations of a guard interval remover 1441, an S/P 1442, an FFT 1443, and a P/S 1448 are identical to those of the guard interval remover 141, the S/P 142, the FFT 143, and the P/S 145 illustrated in FIG. 1, and thus their description will not be repeated.

Figure 14B:
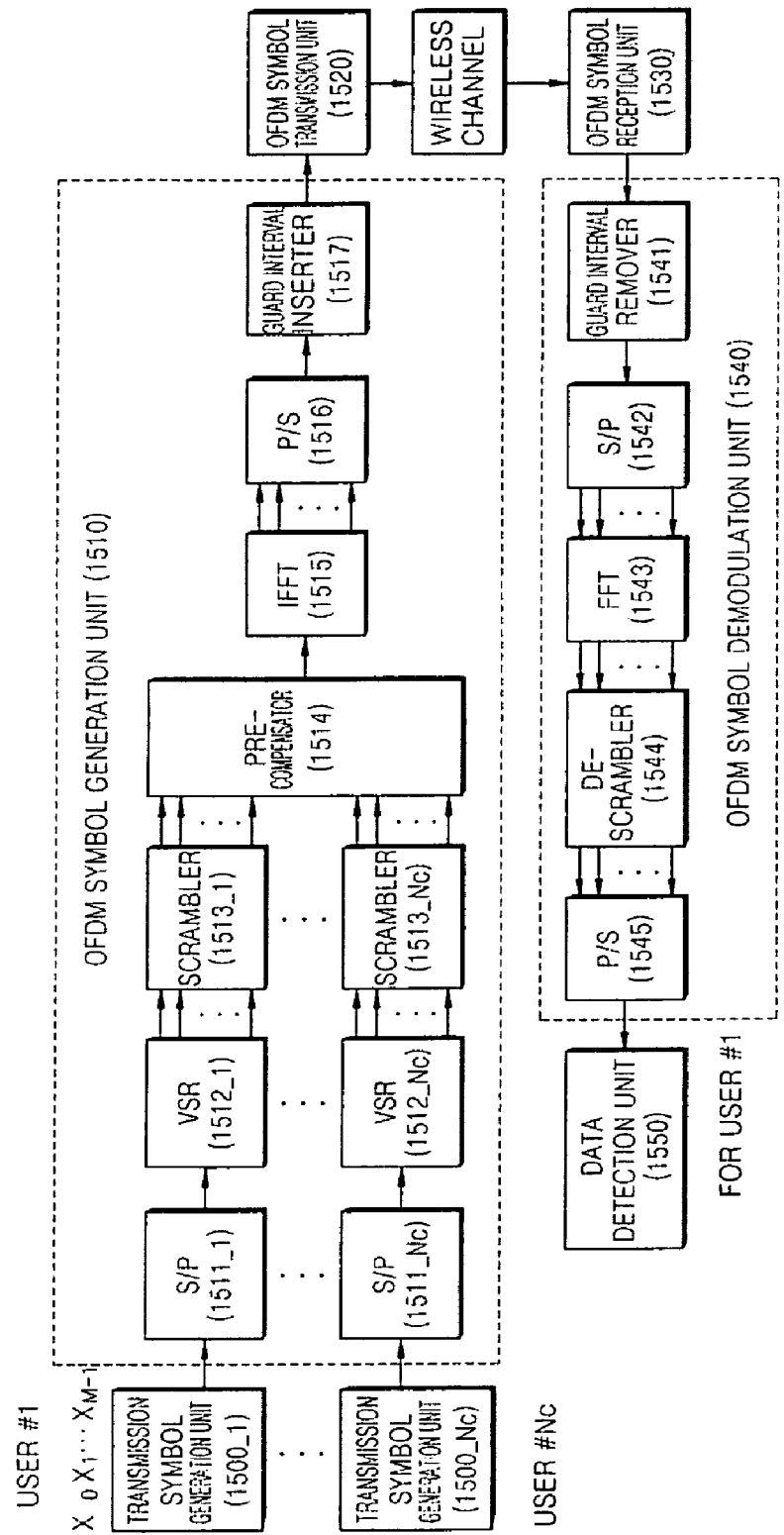

FIG. 14B is a block diagram illustrating an OFDM cellular system to which an further using a VSR technique according to an embodiment of the present invention. In the present embodiment, a base station generates an OFDM symbol after pre-compensating for the effect of the channel response and transmits the generated OFDM symbol to $N_c$ user terminals. Then, each user terminal detects a desired signal.

Referring to FIG. 14B, like the OFDM cellular system illustrated in FIG. 1, the OFDM cellular system according to the present embodiment includes a transmitting end and a receiving end. The transmitting end includes a plurality of transmission symbol generation units 1500_1 to 1500_$N_c$, an OFDM symbol generation unit 1510, and an OFDM symbol transmission unit 1520. The receiving end includes an OFDM symbol reception unit 1530, an OFDM symbol demodulation unit 1540, and a data detection unit 1550. The present embodiment will be described based on the assumption that the transmitting end denotes a transmitting end of the base station, the receiving end denotes a target user terminal, and the target user terminal has a user index value of i=1.

Each of the transmission symbol generation units 1500_1 to 1500_$N_c$ generates transmission symbols that are to be transmitted to each target user terminal. For example, a transmission symbol generation unit 1500_i generates transmission symbols $X_{i0}, X_{i1}, \ldots, X_{1M-1}$. Each of a plurality of VSRs 1512_1 to 1512_$N_c$ multiplies an input transmission symbol by a channel randomization code allocated to each target user terminal. When the comb-type resource allocation method is used, a VSR 1512_i may output a vector including, for example, $c_i(0)X_{i0}, c_i(0)X_{i1}, \ldots, c_i(0)X_{1M-1}, c_i(1)X_{i0}, c_i(1) X_{i1}, \ldots, c_i(1)X_{1M-1}, \ldots c_i(G-1)X_{i1}, \ldots, c_i(G-1)X_{1M-1}$.

A scrambler 1513_i multiplies each output of the VSR 1512_i by a scrambling code $S_n$. Such a multiplication is performed by a base station within a cell, and all users share the same scrambling code $S_n$.

A pre-compensator 1514 estimates a channel response $H_i(k)$ between each target user terminal and the base station and pre-codes an input signal based on the estimation result. Since the embodiment of FIG. 14B includes the VSRs 1512_1 to 1512_$N_c$, a pre-coding matrix can be calculated based on a value obtained after the channel response $H_i(k)$ is multiplied by the channel randomization code, and the input signal can be pre-coded using the calculated pre-coding matrix.

Due to the pre-coding process, the receiving end can detect transmission symbols received from the transmitting end without performing a particular signal processing operation. In FIG. 14B, the receiving end is a receiving end of a target terminal having a user index of i=1, and $N_c$=G. in addition, if Equation (26) is used as the pre-coding matrix, an output of an FFT 1543 is defined in the form of $Y(m)=S_m X_{1m}+N_m, Y(M+m)=S_{M+m}X_{1m+NM+m}, \ldots, Y(M(G-1)+m)=S_{M(G-1)+m} X_{1m}+_{NM(G-1)+m}$. Therefore, the data detection unit 1550 sums the outputs of the de-scrambler 1544 up to detect data.

The receiving end performs the same demodulation process as the demodulation process of a receiving end corresponding to a transmitting end which does not perform the VSR operation. In other words, the present embodiment does not require the VSR decoder 1447 illustrated in FIG. 14A.

According to the present invention, even when each of a transmitting end and a receiving end uses a single antenna, the effects of eliminating an interference signal by physically using multiple antennas can be accomplished. Therefore, the hardware complexity caused by the use of multiple antennas does not increase, and the performance in the elimination of the interference signal is not easily affected by the synchronization performance.

If a base station in an uplink uses a virtual MIMO technique according to the present invention, the base station can effectively eliminate the interference of multiple users, thereby increasing the overall radio spectrum efficiency. In addition, if the number of multiple users is less than that of sub-carriers included in a group, a diversity gain can be obtained, which, in turn, enhances system performance.

If the base station in the uplink uses a virtual MIMO technique according to the present invention, the base station can effectively eliminate an interference signal of an interfering user at the boundary of a cell using the virtual MIMO technique. In addition, if the number of multiple users is less than that of sub-carriers included in a group, the diversity gain can be obtained, which, in turn, enhances system performance. If the number of multiple users is equal to that of sub-carriers included in the group, the interference signal of the interfering user can be effectively eliminated, thereby preventing the performance degradation due to the interference signal.

If the base station in the uplink uses a virtual smart antenna technique according to the present invention, an array gain can be obtained. Hence, the performance degradation due to a symbol synchronization error of multiple users can be prevented.

If the base station in the uplink uses a virtual smart antenna technique according to the present invention, the base station can eliminate a signal of an interference user at the boundary of a cell, and the array gain can be obtained. In addition, the performance degradation due to a symbol synchronization error of multiple users can be prevented.

If a base station in a downlink uses a virtual SDMA technique according to the present invention, the base station can perform the virtual SDMA technique through pre-compensation, thereby reducing the performance degradation due to channels. In addition, if the number of multiple users is less than that of sub-carriers included in a group, the diversity gain can achieved.

If a terminal in the downlink uses a virtual MIMO detection technique and a virtual smart antenna technique according to the present invention, when a frequency reuse coefficient is 1, the terminal can effectively eliminate the interference of adjacent cells. Hence, the interference between cells can be prevented. In addition, since signals of adjacent cells can be simultaneously demodulated, the virtual MIMO detection technique is effective for a handoff. The diversity gain and the array gain can also be obtained according to channel conditions, and the performance degradation due to a symbol synchronization error can be prevented.

In a virtual multi-antenna technique using a VSR technique according to the present invention, channel responses corresponding to a group can be virtually and randomly changed. Hence, the performance degradation due to the correlation between channels can be reduced.

The present invention can also be implemented as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet).

The computer-readable recording medium can also be distributed over network-coupled computer systems so that the computer-readable code is stored and executed in a distributed fashion. Also, programmers skilled in the art to which the present invention pertains can easily construe functional programs, code, and code segments for accomplishing the present invention.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A virtual multi-antenna method for transmitting transmission symbols using an orthogonal frequency division multiplexing (OFDM) system, the method comprising:
grouping sub-carriers in a frequency domain of an OFDM symbol and generating at least one group including a plurality of a number G of sub-carriers; and
regarding the G sub-carriers included in the at least one group as multiple channels used in a multi-antenna technique and virtually applying the multi-antenna technique to the transmission and reception of the OFDM symbol,
wherein the virtually applying the multi-antenna technique comprises transmitting or receiving identical transmission symbols in each of the plurality of G sub-carriers in the at least one group at the same time.

2. The method of claim 1, wherein the regarding of the G sub-carriers included in the at least one group as multiple channels used in a multi-antenna technique and the virtually applying of the multi-antenna technique to the transmission and reception of the OFDM symbol comprises a spatial division multiple access (SDMA) technique, a multi input multi output (MIMO) detection technique, and a smart antenna technique.

3. The method of claim 1, wherein the regarding of the G sub-carriers included in the at least one group as multiple channels used in a multi-antenna technique and the virtually applying of the multi-antenna technique comprises:
estimating channel responses of the G sub-carriers between a number Nc of receiving devices and a transmitting device using the transmitting device;
pre-coding a number Nc of symbols that are to be transmitted over the G sub-carriers based on a channel matrix composed of the estimated channel responses using the transmitting device, and thus pre-compensating for channel effects of the G sub-carriers; and
transmitting an OFDM symbol comprising the Nc pre-coded symbols from the transmitting device to the Nc receiving devices.

4. The method of claim 1, wherein the regarding of the G sub-carriers included in the at least one group as multiple channels used in a multi-antenna technique and the virtually applying of the multi-antenna technique comprises:
multiplying symbols that are to be carried in the G sub-carriers by G weights for randomizing channels between a number Nc of transmitting devices, respectively, and transmitting an OFDM symbol comprising the multiplied symbols using each of the Nc transmitting devices;
estimating channel responses of the G sub-carriers between the Nc terminals and a receiving device and multiplying each of the values of the estimated channel responses by a weight used by a target transmitting device using the receiving device; and
applying a virtual multi-antenna technique based on the multiplied values of the estimated channel responses and detecting a signal transmitted from the target transmitting device using the receiving device.

5. The method of claim 1, wherein the grouping of the sub-carriers and the generating of the at least one group comprises generating the at least one group using any one of a comb-type grouping method, a cluster-type grouping method, and a random-type grouping method.

6. A virtual multi-antenna method for an uplink of an OFDM-based cellular system, the method comprising:
grouping sub-carriers in a frequency domain of an OFDM symbol using a grouping method common to a number Nc of terminals and generating at least one group including a number G of sub-channels using the Nc terminals;
mapping symbols to the G sub-carriers included in the at least one group to generate an OFDM symbol and transmitting the generated OFDM symbol to a base station using the Nc terminals; and
detecting a signal using a virtual multi-antenna technique in which the reception signals of the G sub-carriers are regarded as signals received by G virtual antennas using the base station, wherein the mapping symbols to the G sub-carriers and the transmitting the generated OFDM symbol comprise allocating identical transmission symbols in each of the G sub-carriers in the at least one group and transmitting the identical transmission symbols in the G sub-carriers at the same time.

7. The method of claim 6, wherein the mapping of the symbols and the transmitting of the generated OFDM symbol comprises multiplying the symbols by G weights for randomizing uplink channels, respectively, and mapping the multiplied symbols to the G sub-carriers using the Nc terminals, and the detecting of the signal comprises estimating channel responses of the G sub-carriers, multiplying values of the estimated channel responses by the G weights, respectively, and applying the virtual multi-antenna technique based on the multiplied values of the estimated channel responses using the base station.

8. The method of claim 7, wherein the G weights are of the same magnitudes and correspond to M-ary phase shift keying (M-PSK) values where M is a positive integer.

9. The method of claim 6, wherein the grouping of the sub-carriers and the generating of the at least one group comprises generating the at least one group using any one of a comb-type grouping method, a cluster-type grouping method, and a random-type grouping method.

10. The method of claim 6, wherein the virtual multi-antenna technique is a virtual spatial division multiple access (SDMA) technique.

11. The method of claim 10, wherein the detecting of the signal comprises eliminating an interference signal and detecting a signal of a desired user using a signal detection technique comprising a zero forcing (ZF) technique, a minimum mean square error (MMSE) technique, a successive interference cancellation (SIC) technique, a parallel interference cancellation (PIC) technique, and a maximum likelihood (ML) technique.

12. The method of claim 10, wherein the detecting of the signal comprises simultaneously detecting signals of multiple users using the signal detection technique comprising the ZF technique, the MMSE technique, the SIC technique, the PIC technique, and the ML technique.

13. The method of claim 6, wherein the Nc terminals comprise terminals located in a boundary area of a cell and terminals located in a boundary area of an adjacent cell.

14. The method of claim 6, wherein the virtual multi-antenna technique is a virtual smart antenna technique.

15. The method of claim 14, wherein the detecting of the signal comprises
estimating an auto-correlation matrix of a vector comprised of the reception signals of the G sub-carriers;
estimating a symbol timing offset between the Nc terminals; and
detecting the signal using a weight of a virtual smart antenna calculated based on the estimated auto-correlation matrix and the symbol timing offset.

16. The method of claim 15, wherein the estimating of the auto-correlation matrix comprises estimating the auto-correlation matrix using the fact that the effect of the symbol timing offset on the reception signals is represented as phase rotation between adjacent sub-carriers.

17. The method of claim 15, wherein the estimating of the symbol timing offset comprises estimating the symbol timing offset by virtually applying a smart antenna technique comprising a multiple signal classification (MUSIC) technique and an estimation of signal parameters via rotational invariance technique (ESPRIT) to the estimated auto-correlation matrix and thereby, estimating the symbol timing offset.

18. The method of claim 14, wherein the detecting of the signal comprises calculating the weight of the virtual smart antenna using a training signal-based technique comprising a least mean square (LMS) technique, a recursive least square (RLS) technique, and a sample matrix inversion (SMI) technique.

19. The method of claim 14, wherein the detecting of the signal comprises calculating the weight of the virtual smart antenna using a symbol timing offset-based technique comprising a null-steering technique and a minimum variance distortionless response (MVDR) technique.

20. The method of claim 14, wherein the detecting of the signal comprises eliminating an interference signal using the virtual smart antenna technique and detecting the signal of a desired user.

21. The method of claim 14, wherein the detecting of the signal comprises simultaneously detecting the signals of multiple users using the virtual smart antenna technique.

22. The method of claim 14, wherein the Nc terminals comprise the terminals located in a boundary area of a cell and the terminals located in a boundary area of an adjacent cell.

23. A virtual multi-antenna method for a downlink of an OFDM-based cellular system, the method comprising:
grouping sub-carriers of an OFDM symbol and generating at least one group including a number G of sub-carriers in a base station;
calculating a channel response matrix for the G sub-carriers between a number Nc of terminals and the base station using the base station;
pre-coding Nc symbols based on the channel response matrix and thus, pre-compensating for effects of down-link channels using the base station; and
mapping the pre-coded Nc symbols to the G sub-carriers, respectively, in order to generate an OFDM symbol and transmitting the generated OFDM symbol from the base station to the Nc terminals,
wherein the mapping the pre-coded Nc symbols and transmitting the generated OFDM symbol comprise mapping identical transmission symbols in each of the G sub-carriers in the at least one group and transmitting the identical transmission symbols on the G sub-carriers at the same time.

24. The method of claim 23, further comprising detecting a signal by adding reception signals of the G sub-carriers using each of the Nc terminals.

25. The method of claim 23, wherein the grouping of the sub-carriers and the generating of the at least one group comprises generating the at least one group using any one of a comb-type grouping method, a cluster-type grouping method, and a random-type grouping method.

26. The method of claim 23, wherein the pre-coding of the Nc symbols is performed using a ZF technique, an orthogonalization technique, a dirty paper coding (DPC) technique, and a Tomlinson-Harashima pre-coding (THP) technique.

27. The method of claim 23, wherein the calculating of the channel response matrix comprises calculating the channel response matrix by multiplying values of the estimated channel responses of the G sub-carriers of each of the Nc terminals by G weights for randomizing the downlink channels, respectively, using the base station.

28. The method of claim 27, wherein the G weights are of the same magnitudes and correspond to M-ary phase shift keying (M-PSK) values where M is a positive integer.

29. A virtual multi-antenna method for a downlink of an OFDM-based cellular system, the method comprising:
grouping sub-channels of an OFDM symbol using a grouping method common to a number Nc of base stations and generating at least one group including a number G of sub-carriers using Nc base stations;

mapping transmission symbols to the G sub-carriers in order to generate the OFDM symbol and transmitting the generated OFDM symbol to a terminal using the Nc base stations; and detecting a desired signal using a virtual multi-antenna technique in which reception signals of the G sub-carriers are regarded as signals received by G virtual antennas using the terminal, wherein the mapping transmission symbols and the transmitting the generated OFDM symbol comprise mapping identical transmission symbols in each of the G sub-carriers in the at least one group and transmitting the identical transmission symbols on the G sub-carriers at the same time.

30. The method of claim 29, wherein the grouping of the sub-carriers and the generating of the at least one group comprises generating the at least one group using any one of a comb-type grouping method, a cluster-type grouping method, and a random-type grouping method.

31. The method of claim 29, wherein the virtual multi-antenna technique is a virtual spatial division multiple access (SDMA) technique.

32. The method of claim 29, wherein the detecting of the desired signal comprises eliminating an interference signal and detecting a signal transmitted from a cell to which the terminal belongs using a signal detection technique comprising a zero forcing (ZF) technique, an minimum mean square error (MMSE) technique, a successive interference cancellation (SIC) technique, a parallel interference cancellation (PIC) technique, and a maximum likelihood (ML) technique.

33. The method of claim 29, wherein the detecting of the desired signal comprises simultaneously detecting a signal of an adjacent cell and a signal of a target cell using the signal detection technique which comprises a zero forcing (ZF) technique, a minimum mean square error (MMSE) technique, a successive interference cancellation (SIC) technique, a parallel interference cancellation (PIC) technique, and a maximum likelihood (ML) technique.

34. The method of claim 29, wherein the mapping of the transmission symbols and the transmitting of the generated OFDM symbol comprises multiplying the transmission symbols by G weights for randomizing downlink channels, respectively, and mapping the multiplied transmission symbols to the G sub-carriers using each of the Nc base stations, and the detecting of the desired signal comprises estimating channel responses of the G sub-carriers, multiplying values of the estimated channel responses by the G weights, respectively, and applying the virtual multi-antenna technique based on the multiplied values of the estimated channel responses using the terminal.

35. The method of claim 34, wherein the G weights are of the same magnitudes and correspond to M-ary phase shift keying (M-PSK) values where M is a positive integer.

36. The method of claim 29, wherein the virtual multi-antenna technique is a virtual smart antenna technique.

37. The method of claim 36, wherein the detecting of the desired signal comprises:

estimating an auto-correlation matrix of a vector comprised of the reception signals of the G sub-carriers;

estimating a symbol timing offset between adjacent cells; and detecting the desired signal using a weight of a virtual smart antenna calculated based on the estimated auto-correlation matrix and the symbol timing offset.

38. The method of claim 37, wherein the estimating of the auto-correlation matrix comprises estimating the auto-correlation matrix using the fact that the effect of the symbol timing offset on the reception signals is represented as phase rotation between adjacent sub-carriers.

39. The method of claim 37, wherein the estimating of the symbol timing offset comprises estimating the symbol timing offset by virtually applying a smart antenna technique comprising a multiple signal classification (MUSIC) technique and an estimation of signal parameters via rotational invariance technique ESPIRIT to the estimated auto-correlation matrix and thereby, estimating the symbol timing offset.

40. The method of claim 36, wherein the detecting of the desired signal comprises calculating the weight of the virtual smart antenna using a training signal-based technique which comprises a least mean square (LMS) technique, a recursive least square (RLS) technique, and a sample matrix inversion (SMI) technique.

41. The method of claim 36, wherein the detecting of the desired signal comprises calculating the weight of the virtual smart antenna using a symbol timing offset-based technique which comprises a null-steering technique and a minimum variance distortionless response (MVDR) technique.

42. The method of claim 36, wherein the detecting of the desired signal comprises eliminating the interference signal of the adjacent cell using the virtual smart antenna technique and detecting the desired signal.

43. The method of claim 36, wherein the detecting of the desired signal comprises simultaneously detecting an signal of an adjacent cell and a signal of a target signal using the virtual smart antenna technique.

44. A non-transitory computer-readable recording medium on which a program for executing the method of claim 1 is recorded.

* * * * *